(12) United States Patent
Cox et al.

(10) Patent No.: US 10,781,361 B2
(45) Date of Patent: Sep. 22, 2020

(54) STABILIZED NANOPARTICLE COMPOSITIONS COMPRISING IONS

(71) Applicant: Saudi Arabian Oil Company, Dhahran (SA)

(72) Inventors: Jason R. Cox, Ashland, MA (US);
Dmitry Kosynkin, Dhahran (SA);
Hooisweng Ow, Woburn, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/268,229

(22) Filed: Feb. 5, 2019

(65) Prior Publication Data
US 2019/0264092 A1 Aug. 29, 2019

Related U.S. Application Data

(62) Division of application No. 15/205,869, filed on Jul. 8, 2016, now Pat. No. 10,344,202.

(Continued)

(51) Int. Cl.
*C09K 8/588* (2006.01)
*C09K 8/03* (2006.01)
(Continued)

(52) U.S. Cl.
CPC .............. *C09K 8/588* (2013.01); *C09K 8/03* (2013.01); *C09K 8/50* (2013.01); *C09K 8/62* (2013.01);
(Continued)

(58) Field of Classification Search
CPC ............ C09K 2208/08; C09K 2208/10; C09K 2208/26; C09K 2208/32; C09K 8/03;
(Continued)

(56) References Cited

U.S. PATENT DOCUMENTS 6,250,848 B1   6/2001   Moridis et al.
8,269,501 B2   9/2012   Schmidt et al.
(Continued)

FOREIGN PATENT DOCUMENTS

EP    1721603        11/2006
WO    2011063023     5/2011
(Continued)

OTHER PUBLICATIONS

Bagaria et al., "Iron Oxide Nanoparticles Grafted with Sulfonated Copolymers are Stable in Concentrated Brine at Elevated Temperatures and Weakly Adsorb on Silica," ACS Applied Materials & Interfaces, vol. 5, No. 8, Mar. 25, 2013, pp. 3329-3339.

(Continued)

*Primary Examiner* — Alicia Bland
(74) *Attorney, Agent, or Firm* — Fish & Richardson P.C.

(57) ABSTRACT

A composition including a coated nanoparticle and an ion, wherein the coated nanoparticle includes a nanoparticle, a linker, and a stabilizing group; methods of making and using the composition; and systems including the composition. The linker includes an anchoring group, a spacer, and a terminal group. The anchoring group is covalently bound to the nanoparticle and at least one of the terminal groups is covalently bound to at least one stabilizing group. A composition including a crosslinked-coated nanoparticle and an ion, wherein the crosslinked-coated nanoparticle includes a nanoparticle and a coating that includes a linker, a crosslinker, and a stabilizing group; methods of making and using the composition; and systems including the composition.

5 Claims, 10 Drawing Sheets

Related U.S. Application Data

(60) Provisional application No. 62/191,871, filed on Jul. 13, 2015.

(51) Int. Cl.
| | | |
|---|---|---|
| *C09K 8/50* | (2006.01) | |
| *C09K 8/62* | (2006.01) | |
| C09K 8/42 | (2006.01) | |
| C09K 8/52 | (2006.01) | |
| C09K 8/60 | (2006.01) | |
| C09K 8/72 | (2006.01) | |

(52) U.S. Cl.
CPC ............... *C09K 8/42* (2013.01); *C09K 8/52* (2013.01); *C09K 8/60* (2013.01); *C09K 8/72* (2013.01); *C09K 2208/08* (2013.01); *C09K 2208/10* (2013.01); *C09K 2208/26* (2013.01); *C09K 2208/32* (2013.01)

(58) Field of Classification Search
CPC ... C09K 8/42; C09K 8/50; C09K 8/52; C09K 8/588; C09K 8/60; C09K 8/62; C09K 8/72
See application file for complete search history.

(56) References Cited

U.S. PATENT DOCUMENTS

| | | | |
|---|---|---|---|
| 8,638,104 | B2 | 1/2014 | Barber et al. |
| 8,877,954 | B2 | 11/2014 | Giesenberg et al. |
| 9,080,097 | B2 | 7/2015 | Gupta et al. |
| 9,133,709 | B2 | 9/2015 | Huh et al. |
| 10,273,399 | B2 | 4/2019 | Cox |
| 10,308,865 | B2 | 6/2019 | Cox |
| 10,308,895 | B2 | 6/2019 | Vidal et al. |
| 10,487,259 | B2 | 11/2019 | Cox |
| 2003/0220204 | A1 | 11/2003 | Baran et al. |
| 2006/0105052 | A1 | 5/2006 | Acar et al. |
| 2007/0114030 | A1* | 5/2007 | Todd .................. C09C 3/12 166/280.2 |
| 2009/0277625 | A1 | 11/2009 | Bai et al. |
| 2011/0030949 | A1 | 2/2011 | Weaver et al. |
| 2012/0135080 | A1 | 5/2012 | Bromberg et al. |
| 2013/0109261 | A1 | 5/2013 | Koene |
| 2013/0244914 | A1 | 9/2013 | Wu et al. |
| 2013/0296453 | A1 | 11/2013 | Giesenberg et al. |
| 2013/0312970 | A1 | 11/2013 | Lafitte et al. |
| 2013/0341030 | A1* | 12/2013 | Brannon ............ C09K 8/60 166/308.2 |
| 2014/0060832 | A1* | 3/2014 | Mahoney ........... C09K 8/62 166/280.2 |
| 2014/0190700 | A1* | 7/2014 | Tang ................. E21B 43/025 166/307 |
| 2015/0013983 | A1 | 1/2015 | Alwattari |
| 2015/0050741 | A1 | 2/2015 | Tour et al. |
| 2015/0118501 | A1 | 4/2015 | Lu |
| 2015/0159079 | A1 | 6/2015 | Huh et al. |
| 2015/0268370 | A1 | 9/2015 | Johnston et al. |
| 2015/0368547 | A1* | 12/2015 | Lesko ................ C09K 8/665 166/280.2 |
| 2015/0376493 | A1 | 12/2015 | Huh et al. |
| 2016/0040514 | A1 | 2/2016 | Rahmani et al. |
| 2016/0083641 | A1 | 3/2016 | Gamage |
| 2016/0264846 | A1 | 9/2016 | Bennetzen et al. |

FOREIGN PATENT DOCUMENTS

| | | |
|---|---|---|
| WO | 2012154332 | 11/2012 |
| WO | 2012158478 | 11/2012 |
| WO | 2013142869 | 9/2013 |
| WO | 2014066793 | 5/2014 |
| WO | 2015044446 | 4/2015 |

OTHER PUBLICATIONS

Bala et al., "Interaction of Different Metal Ions with Carboxylic Acid Group: A Quantitative Study," The Journal of Physical Chemistry A, vol. 111, No. 28, Jun. 2007; pp. 6183-6190.

Chen et al., "Aggregation Kinetics of Alginate-Coated Hematite Nanoparticles in Monovalent and Divalent Electrolytes," Environmental Science & Technology, vol. 40, No. 5, Mar. 2006, pp. 1516-1523.

Chen et al.; "Hydration Repulsion between Carbohydrate Surfaces Mediated by Temperature and Specific Ions," Scientific Reports, vol. 6, Jun. 23, 2016, pp. 1-10.

Cole et al.; "Polyethylene Glycol Modified, Cross-Linked Starch-Coated Iron Oxide Nanoparticles for Enhanced Magnetic tumor Targeting," Biomaterials, vol. 32, No. 8, Mar. 1, 2011, pp. 2183-2193.

Kramer, "Water-Soluble Dendritic Architectures with Carbohydrate Shells for the Templation and Stabilization of Catalytically Active Metal Nanoparticles," published by ACS, Macromolecules, vol. 38, No. 20, Aug. 27, 2005, pp. 8308-8315.

Martinez et al., "Polysaccharide-based Nanoparticles for Controlled Release Formulations," The Delivery of Nanoparticles, Published May 2012, pp. 185-222.

Saeki et al., "Upper and lower critical solution temperatures in poly (ethylene glycol) solutions," Polymer, vol. 17, No. 8, Aug. 1976; pp. 685-689.

ShamsiJazeyi et al., "Polymer-Coated Nanoparticles for Enhance Oil Recovery," Journal of Applied Polymer Science, vol. 131, No. 15, Aug. 5, 2014, 13 pages.

Zhao et al., "Chromatographic Separation of Highly Soluble Diamond Nanoparticles Prepared by Polyglycerol Grafting," Angewandte Chemie International Edition, vol. 50, No. 6, Feb. 7, 2011, pp. 1388-1392.

Communication Pursuant to Article 94(3) EPC issued in European Application No. 16741485.3 dated Dec. 18, 2018, 4 pages.

Communication Pursuant to Article 94(3) EPC issued in European Application No. 16741487.9 dated Jan. 22, 2019, 5 pages.

Invitation to Pay Additional Fees and Partial International Search Report issued in International Application No. PCT/US2016/041584 dated Oct. 7, 2016; 7 pages.

International Search Report and Written Opinion issued in International Application No. PCT/US2016/041604 dated Sep. 28, 2016; 17 pages.

International Search Report and Written Opinion issued in International Application No. PCT/US2016/041584 dated Dec. 22, 2016; 29 pages—new art cited.

Communication Pursuant to Article 94(3) EPC issued in European Application No. 16741485.3 dated May 17, 2019, 5 pages.

Gulf Cooperation Council Examination Report issued in GCC Application No. GC 2016-31702 dated Mar. 10, 2019, 4 pages.

Gulf Cooperation Council Examination Report issued in GCC Application No. GC 2016-31703 dated Mar. 10, 2019, 4 pages.

Gulf Cooperation Council Examination Report issued in GCC Application No. 2016-31702 dated Aug. 12, 2019, 3 pages.

Gulf Cooperation Council Examination Report issued in GCC Application No. 2016-31703 dated Aug. 11, 2019, 3 pages.

Gulf Cooperation Council Examination Report issued in GCC Application No. GC 2016-38077 dated Dec. 16, 2019, 4 pages.

Chinese Office Action issued in Chinese Application No. 201680052758.7 dated Feb. 6, 2020, 13 pages (English translation).

Chinese Office Action issued in Chinese Application No. 201680052785.4 dated May 7, 2020, 6 pages.

\* cited by examiner

STABILIZED NANOPARTICLE COMPOSITIONS COMPRISING IONS

This application is a Divisional of and claims the benefit of priority to U.S. patent application Ser. No. 15/205,869, filed Jul. 8, 2016, which claims the benefit of priority to U.S. Provisional Patent Application Ser. No. 62/191,871, filed Jul. 13, 2015, the contents of which are hereby incorporated by reference.

TECHNICAL FIELD

This document relates to methods and compositions used in treating subterranean formations for enhancing hydrocarbon fluid recovery.

SUMMARY

Provided in this disclosure is a method of treating a subterranean formation. The method includes placing in a subterranean formation a composition including a coated nanoparticle and an ion. The coated nanoparticle includes a nanoparticle, a linker, and a stabilizing group. The linker includes an anchoring group, a spacer, and a terminal group. Further, the anchoring group is covalently bound to the nanoparticle and at least one of the terminal groups is covalently bound to at least one stabilizing group.

In some embodiments, the composition further includes an aqueous liquid. The aqueous liquid can include at least one of water, brine, produced water, flowback water, brackish water, fresh water, Arab-D-brine, sea water, mineral waters, and other waters of varying salinity and mineral concentration. The aqueous liquid can include at least one of a drilling fluid, a fracturing fluid, a diverting fluid, an injection fluid, and a lost circulation treatment fluid.

In some embodiments, method further includes obtaining or providing the composition. The obtaining or providing of the composition can occur above-surface. The obtaining or providing of the composition can occur in the subterranean formation.

In some embodiments, the method is a method of drilling the subterranean formation. In some embodiments, the method is a method of fracturing the subterranean formation. In some embodiments, the method is a method of conformance control. In some embodiments, the method is a method of subsurface imaging the subterranean formation. In some embodiments, the method is a method of aquifer remediation in the subterranean formation.

In some embodiments, the coated nanoparticles have a lower critical solution temperature ("LCST") of greater than 90° C.

In some embodiments, the coated nanoparticles have a hydrodynamic radius of less than about 100 nanometers (nm). In some embodiments, the coated nanoparticles, when at a concentration of about 2,000 parts per million (ppm, as used herein 1 ppm is equal to 1 mg/L) in synthetic sea water, have a hydrodynamic radius of less than about 250 nm after heating at 90° C. in the synthetic sea water for 8 days. In some embodiments, the coated nanoparticles, when at a concentration of about 2,000 ppm in synthetic Arab-D brine, have a hydrodynamic radius of less than about 250 nm after heating at 90° C. in the synthetic Arab-D brine at a concentration of 2,000 ppm for 8 days. In some embodiments, the coated nanoparticles, when at a concentration of about 1,000 ppm in synthetic Arab-D brine, have a hydrodynamic radius of less than about 250 nm after heating at 90° C. in the synthetic Arab-D brine at a concentration of 1,000 ppm for 8 days.

In some embodiments, the coated nanoparticles have a hydrodynamic radius that is less than the hydrodynamic radius of similar nanoparticles without the one or more stabilizing groups in a similar composition under similar conditions. For example, the coated nanoparticles can have a hydrodynamic radius that is less than the hydrodynamic radius of similar nanoparticles without the one or more stabilizing groups in a similar composition in synthetic sea water or synthetic Arab-D brine.

In some embodiments, the nanoparticle is selected from the group consisting of a silica nanoparticle, a metal oxide nanoparticle, an upconverting nanoparticle, a superparamagnetic nanoparticle, and mixtures thereof. In some embodiments, the nanoparticle can include a metal oxide. For example, the nanoparticle can include a magnetic metal oxide. In some embodiments, the nanoparticle includes an iron oxide, a nickel oxide, a cobalt oxide, a magnetite, a ferrite, or combinations thereof. In some embodiments, the nanoparticle includes a metal oxide including an atom selected from the group consisting of Zn, Cr, Co, Dy, Er, Eu, Fe, Gd, Gd, Pr, Nd, Ni, In, Pr, Sm, Tb, Tm, and combinations thereof. In some embodiments, the nanoparticle is a silica nanoparticle. For example, the nanoparticle can be a fluorescent silica nanoparticle.

In some embodiments, the nanoparticles have an average particle size of about 10 nm to about 100 nm.

In some embodiments, the linker includes polyethylenimine. For example, the nanoparticle and covalently bound linker can be obtained by reacting trimethoxysilylpropyl modified polyethylenimine with the nanoparticle.

In some embodiments, the linker spacer includes the subunit:

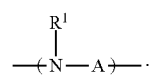

The variable $R^1$ can be selected from the from the group consisting of —H,

or a linear or branched $(C_1-C_{20})$alkyl interrupted with 0, 1, 2, 3, 4, 5, 6, 7, 8, or 9 substituted or unsubstituted nitrogen atoms. The wavy line labeled 1 indicates a point of attachment to another linker on the coated nanoparticle. The variable A is a $(C_1-C_{10})$alkyl interrupted with 0, 1, 2, 3, or 4 oxygen atoms or substituted or unsubstituted nitrogen atoms.

In some embodiments, the linker terminal group is —OR$^A{}_2$, —SR$^A{}_2$, —N—NR$^A{}_2$, O—NR$^A{}_2$, or NR$^A{}_2$. The variable R$^A$, at each occurrence is independently selected from —H or

The wavy line labeled 2 indicates a point of attachment to the stabilizing group.

In some embodiments, the stabilizing group includes one or more of —OH, —CO$_2$H, —CO$_2$CH$_3$, a phosphonate, a phosphate, a sulfonate, or a sulfate. For example, the stabilizing group can include a functional group selected from group consisting of:

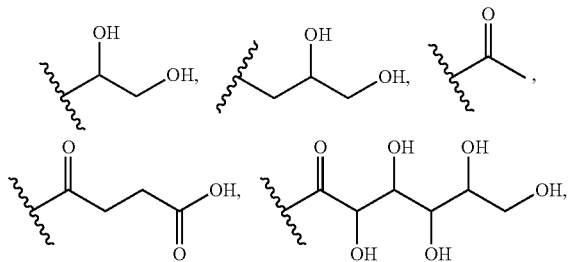

and combinations thereof.
The wavy line indicates a point of attachment to the linker terminal group.

In some embodiments, the coated nanoparticles have a positive zeta potential.

In some embodiments, about 5% to about 95% of terminal groups are covalently bound to a stabilizing group.

In some embodiments, the ion includes one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. For example, the ion can include a calcium ion.

In some embodiments, the providing or obtaining the composition includes determining the presence and concentration of at least one ion of a water in a subterranean formation and doping the composition with the determined ion. The method can further include determining the concentration of the at least one ion of the water in the subterranean formation and increasing the amount of the determined ion in the composition such that molarity of the determined ion in the composition is at least 10% of the molarity of the at least one ion of the water in the subterranean formation.

In some embodiments, the composition further includes a kosmotropic ion. The method can further include aggregating, or aggregating and precipitating the coated nanoparticles in the subterranean formation by the addition of a kosmotropic ion.

In some embodiments, the composition further includes a chaotropic ion.

In some embodiments, the method further includes combining the composition with an aqueous or oil-based fluid including a drilling fluid, a stimulation fluid, fracturing fluid, a spotting fluid, a clean-up fluid, a completion fluid, a remedial treatment fluid, an abandonment fluid, a pill, an acidizing fluid, a cementing fluid, a packer fluid, an imaging fluid or a combination thereof, to form a mixture, in which the placing the composition in the subterranean formation includes placing the mixture in the subterranean formation.

In some embodiments, at least one of prior to, during, and after the placing of the composition in the subterranean formation, the composition is used in the subterranean formation, at least one of alone and in combination with other materials, as a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, an imaging fluid, or a combination thereof.

In some embodiments, the composition further includes a saline, an aqueous base, an oil, an organic solvent, a synthetic fluid oil phase, an aqueous solution, an alcohol or a polyol, a cellulose, a starch, an alkalinity control agent, an acidity control agent, a density control agent, a density modifier, an emulsifier, a dispersant, a polymeric stabilizer, a crosslinking agent, a polyacrylamide, a polymer, an antioxidant, a heat stabilizer, a foam control agent, a foaming agent, a solvent, a diluent, a plasticizer, a filler, an inorganic particle, a pigment, a dye, a precipitating agent, a rheology modifier, an oil-wetting agent, a set retarding additive, a surfactant, a corrosion inhibitor, a gas, a weight reducing additive, a heavy-weight additive, a lost circulation material, a filtration control additive, a salt, a fiber, a thixotropic additive, a breaker, a crosslinker, a gas, a rheology modifier, a curing accelerator, a curing retarder, a pH modifier, a chelating agent, a scale inhibitor, an enzyme, a resin, a water control material, a polymer, an oxidizer, a marker, a Portland cement, a pozzolana cement, a gypsum cement, a high alumina content cement, a slag cement, a silica cement, a fly ash, a metakaolin, a shale, a zeolite, a crystalline silica compound, an amorphous silica, a fiber, a hydratable clay, a microsphere, a pozzolan lime, or combinations thereof.

In some embodiments, placing the composition in the subterranean formation includes fracturing at least part of the subterranean formation to form at least one subterranean fracture.

In some embodiments, the composition further includes a proppant, a resin-coated proppant, or a combination thereof.

In some embodiments, the placing of the composition in the subterranean formation includes pumping the composition through a drill string disposed in a wellbore, through a drill bit at a downhole end of the drill string, and back above-surface through an annulus. The method can further include, processing the composition exiting the annulus with at least one fluid processing unit to generate a cleaned composition and recirculating the cleaned composition through the wellbore.

Also, provided in this disclosure is a method of treating a subterranean formation, the method including (i) placing in a subterranean formation a composition including (a) a coated nanoparticle including a silica nanoparticle, a linker, and a stabilizing group, and (b) a calcium ion. The linker includes a silane anchoring group and polyethylenimine. The stabilizing group includes a propyl 1,2 diol. Further, the linker is covalently bound to the nanoparticle and at least one amine of the polyethylenimine is covalently bound to the propyl 1,2 diol stabilizing group.

Also, provided in this disclosure is a coated nanoparticle composition including (i) a coated nanoparticle including a nanoparticle, a linker, and a stabilizing group and (ii) an ion. The linker includes a silane anchoring group, a spacer, and a terminal group. Further, the silane anchoring group is covalently bound to the nanoparticle core and at least one of the terminal groups is covalently bound to at least one stabilizing group.

In some embodiments, the composition further includes an aqueous liquid including one or more of water, brine, produced water, flowback water, brackish water, fresh water, Arab-D-brine, sea water, mineral waters, and other waters of varying salinity and mineral concentration.

In some embodiments, the nanoparticle is selected from the group consisting of a silica nanoparticle, a metal oxide nanoparticle, an upconverting nanoparticle, a superparamagnetic nanoparticle, and mixtures thereof. The nanoparticle can be a silica nanoparticle. The linker can include polyethylenimine. The stabilizing group can include a functional group selected from the group consisting of:

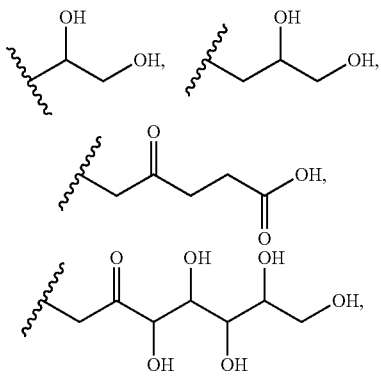

and combinations thereof. The wavy line indicates a point of attachment to the linker terminal group.

The ion can include one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. For example, the ion can include a calcium ion. Also provided in this disclosure, is a coated nanoparticle composition including (i) a coated nanoparticle including a silica nanoparticle, a linker, and a stabilizing group, and (ii) a calcium ion. The linker includes a silane anchoring group and polyethylenimine. The stabilizing group includes a propyl 1,2 diol. Further, the linker is covalently bound to the nanoparticle and at least one amine of the polyethylenimine is covalently bound to the propyl 1,2 diol stabilizing group Also provided in this disclosure, is a coated nanoparticle including (i) a nanoparticle, (ii) a linker including a silane anchoring group, a spacer, and a terminal group, and (iii) a stabilizing group. The silane anchoring group is covalently bound to the nanoparticle core and at least one of the terminal groups is covalently bound to the stabilizing group.

Also, provided in this disclosure is a coated nanoparticle including (i) a silica nanoparticle (ii) a linker including a silane anchoring group and polyethylenimine, and (iii) a stabilizing group including propyl 1,2 diol. The linker is covalently bound to the nanoparticle and at least one amine of the polyethylenimine is covalently bound to the propyl 1,2 diol stabilizing group.

Also provided herein is a method of treating a subterranean formation, the method including placing in a subterranean formation a composition including an ion and a crosslinked-coated nanoparticle. The crosslinked-coated nanoparticle includes a nanoparticle and a coating. The coating includes a linker, a crosslinker, and a stabilizing group.

The ion can include one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. In some embodiments, the ion includes a calcium ion.

The linker can be crosslinked with the crosslinker. The stabilizing group can be covalently bound to the linker. In some embodiments, the linker is crosslinked with the crosslinker and the linker is covalently bound to the stabilizing group.

In some embodiments, the linker includes the subunit:

At each occurrence, the variable $R^1$ can be independently selected from the from the group consisting of —H,

or a linear or branched $(C_1-C_{20})$alkyl interrupted with 0, 1, 2, 3, 4, 5, 6, 7, 8, or 9 substituted or unsubstituted nitrogen atoms. The wavy line labeled 1 can indicate a point of attachment to another linker on the crosslinked-coated nanoparticle. At each occurrence, the variable A can independently selected from a $(C_1-C_{10})$alkyl interrupted with 0, 1, 2, 3, or 4 oxygen atoms or substituted or unsubstituted nitrogen atoms.

In some embodiments, the linker includes a terminal group, wherein the terminal group is selected from the group consisting of $OR^A{}_2$, —$SR^A{}_2$, —N—$NR^A{}_2$, O—$NR^A{}_2$, or $NR^A{}_2$. At each occurrence, the variable $R^2$ is independently selected from —H or

The wavy line labeled 2 can indicate a point of attachment to the stabilizing group.

In some embodiments, the linker includes polyethylenimine.

The crosslinker can include an epoxide functional group. In some embodiments, the crosslinker is a bis-epoxide. The bis-epoxide can be a diglycidyl ether. The diglycidyl ether can be selected from the group consisting of a 1,4-butanediol diglycidyl ether, a poly(ethylene glycol) diglycidyl ether, a neopentyl glycol diglycidyl ether, a glycerol diglycidyl ether, a 1,4-Cyclohexanedimethanol diglycidyl ether, a resorcinol diglycidyl ether, a poly(propylene glycol) diglycidyl ether, a bisphenol A diglycidyl ether, diglycidyl ether ($C_6H_{10}O_3$), a 1,2-propanediol diglycidyl ether, 1,4-butanediyl diglycidyl ether, and combinations thereof. In some embodiments, the diglycidyl ether includes a 1,4-Butanediol diglycidyl ether.

The stabilizing group can include one or more of a —OH, —$CO_2H$, —$CO_2CH_3$, a phosphate, or a sulfate. For example, the stabilizing group can include a functional group selected from the group consisting of:

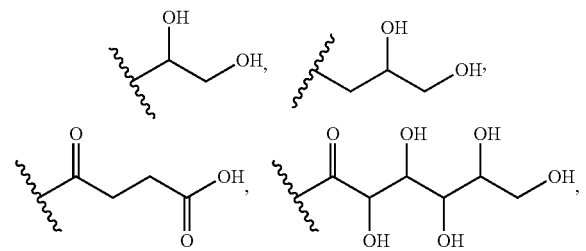

and combinations thereof.

The nanoparticle can be selected from the group consisting of a silica nanoparticle, a polymeric nanoparticle, a metal oxide nanoparticle, an upconverting nanoparticle, a superparamagnetic nanoparticle, and mixtures thereof. In some embodiments, the nanoparticle is a polystyrene nanoparticle. The polystyrene nanoparticle can be a derivatized polystyrene nanoparticle. The derivatized polystyrene nanoparticle can be a sodium dodecyl sulfate derivitized polystyrene nanoparticle. In some embodiments, the nanoparticle includes a metal oxide. In some embodiments, the nanoparticle includes a superparamagnetic metal oxide. The nanoparticle can inlcude a metal oxide selected from the group consisting of an iron oxide, a nickel oxide, a cobalt oxide, a magnetite, a ferrite, and combinations thereof. The nanoparticle can include a metal oxide including an atom selected from the group consisting of Zn, Cr, Co, Dy, Er, Eu, Gd, Gd, Pr, Nd, In, Pr, Sm, Tb, Tm, and combinations thereof.

In some embodiments, the coating is electrostatically adsorbed on the nanoparticle.

In some embodiments, the crosslinked-coated nanoparticles, when at a concentration of about 1,000 ppm in synthetic sea water, have a hydrodynamic radius of less than 30 nm after heating at 90° C. in the synthetic sea water for 14 days.

Also provided herein is a crosslinked-coated nanoparticle composition. The composition includes an ion and a crosslinked-coated nanoparticle. The crosslinked-coated nanoparticle includes a nanoparticle and a coating. The coating includes a linker, a crosslinker, and a stabilizing group.

In some embodiments, the ion includes one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. For example, the ion can include a calcium ion.

In some embodiments, the coating is non-covalently bound to the nanoparticle. For example, the coating can be electrostatically adsorbed on the nanoparticle.

The linker can be crosslinked with the crosslinker. The stabilizing group can be covalently bound to the linker. In some embodiments, the linker is crosslinked with the crosslinker and the linker is covalently bound to the stabilizing group.

In some embodiments, the linker includes the subunit:

At each occurrence, the variable $R^1$ cab be selected from the from the group consisting of —H,

or a linear or branched ($C_1$-$C_{20}$)alkyl interrupted with 0, 1, 2, 3, 4, 5, 6, 7, 8, or 9 substituted or unsubstituted nitrogen atoms. The wavy line labeled 1 can indicate a point of attachment to another linker on the crosslinked-coated nanoparticle. At each occurrence, the variable A can be a ($C_1$-$C_{10}$)alkyl interrupted with 0, 1, 2, 3, or 4 oxygen atoms or substituted or unsubstituted nitrogen atoms.

The linker can include a terminal group that is selected from group consisting of $OR^A_2$, —$SR^A_2$, —N—$NR^A_2$, O—$NR^A_2$, and $NR^A_2$. The variable $R^2$, at each occurrence, can be independently selected from —H or

The wavy line labeled 2 can indicate a point of attachment to the stabilizing group.

In some embodiments, the linker includes polyethylenimine.

The crosslinker can include an epoxide functional group. For example, the crosslinker can be a bis-epoxide. In some embodiments, the bis-epoxide is a diglycidyl ether. The diglycidyl ether can be selected from the group consisting of a 1,4-butanediol diglycidyl ether, a poly(ethylene glycol) diglycidyl ether, a neopentyl glycol diglycidyl ether, a glycerol diglycidyl ether, a 1,4-Cyclohexanedimethanol diglycidyl ether, a resorcinol diglycidyl ether, a poly(propylene glycol) diglycidyl ether, a bisphenol A diglycidyl ether, diglycidyl ether ($C_6H_{10}O_3$), a 1,2-propanediol diglycidyl ether, 1,4-butanediyl diglycidyl ether, and combinations thereof. In some embodiments, the diglycidyl ether includes a 1,4-Butanediol diglycidyl ether.

The stabilizing group can include one or more of the following functional groups a —OH, —CO$_2$H, —CO$_2$CH$_3$, a phosphate, or a sulfate. In some embodiments, the stabilizing group includes a functional group selected from the group consisting of:

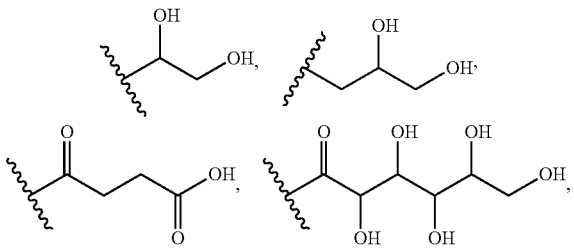

and combinations thereof.

The nanoparticle can be selected from the group consisting of a silica nanoparticle, a polymeric nanoparticle, a metal oxide nanoparticle, an upconverting nanoparticle, a superparamagnetic nanoparticle, and combinations thereof. In some embodiments, the nanoparticle is a polystyrene nanoparticle. The nanoparticle can also be a derivatized polystyrene nanoparticle. For example, the nanoparticle can be a sodium dodecyl sulfate derivatized polystyrene nanoparticle.

In some embodiments, the nanoparticle includes a metal oxide. For example, the nanoparticle can include a metal oxide selected from the group consisting of an iron oxide, a nickel oxide, a cobalt oxide, a magnetite, a ferrite, and combinations thereof. The nanoparticle can include a metal oxide including an atom selected from the group consisting of Zn, Cr, Co, Dy, Er, Eu, Gd, Gd, Pr, Nd, In, Pr, Sm, Tb, Tm, and combinations thereof. In some embodiments, the nanoparticle includes a superparamagnetic metal oxide.

Also provided herein is a crosslinked-coated nanoparticle. The crosslinked-coated nanoparticle includes a crosslinked-coated nanoparticle comprising a nanoparticle and a coating, The coating includes a linker, a crosslinker, and a stabilizing group.

In some embodiments, the coating is non-covalently bound to the nanoparticle. For example, the coating can be electrostatically adsorbed on the nanoparticle.

The linker can be crosslinked with the crosslinker. The stabilizing group can be covalently bound to the linker. In some embodiments, the linker is crosslinked with the crosslinker and the linker is covalently bound to the stabilizing group.

In some embodiments, the linker includes the subunit:

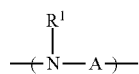

At each occurrence, the variable R$^1$ cab be selected from the from the group consisting of —H,

or a linear or branched (C$_1$-C$_{20}$)alkyl interrupted with 0, 1, 2, 3, 4, 5, 6, 7, 8, or 9 substituted or unsubstituted nitrogen atoms. The wavy line labeled 1 can indicate a point of attachment to another linker on the crosslinked-coated nanoparticle. At each occurrence, the variable A can be a (C$_1$-C$_{10}$)alkyl interrupted with 0, 1, 2, 3, or 4 oxygen atoms or substituted or unsubstituted nitrogen atoms.

The linker can include a terminal group that is selected from group consisting of OR$^A_2$, —SR$^A_2$, —N—NR$^A_2$, O—NR$^A_2$, and NR$^A_2$. The variable R$^2$, at each occurrence, can be independently selected from —H or

The wavy line labeled 2 can indicate a point of attachment to the stabilizing group.

In some embodiments, the linker includes polyethylenimine.

The crosslinker can include an epoxide functional group. For example, the crosslinker can be a bis-epoxide. In some embodiments, the bis-epoxide is a diglycidyl ether. The diglycidyl ether can be selected from the group consisting of a 1,4-butanediol diglycidyl ether, a poly(ethylene glycol) diglycidyl ether, a neopentyl glycol diglycidyl ether, a glycerol diglycidyl ether, a 1,4-Cyclohexanedimethanol diglycidyl ether, a resorcinol diglycidyl ether, a poly(propylene glycol) diglycidyl ether, a bisphenol A diglycidyl ether, diglycidyl ether (C$_6$H$_{10}$O$_3$), a 1,2-propanediol diglycidyl ether, 1,4-butanediyl diglycidyl ether, and combinations thereof. In some embodiments, the diglycidyl ether includes a 1,4-Butanediol diglycidyl ether.

The stabilizing group can include one or more of the following functional groups a —OH, —CO$_2$H, —CO$_2$CH$_3$, a phosphate, or a sulfate. In some embodiments, the stabilizing group includes a functional group selected from the group consisting of:

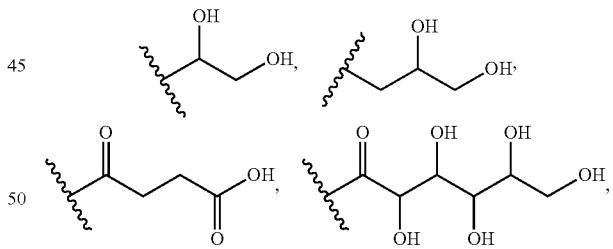

and combinations thereof.

The nanoparticle can be selected from the group consisting of a silica nanoparticle, a polymeric nanoparticle, a metal oxide nanoparticle, an upconverting nanoparticle, a superparamagnetic nanoparticle, and combinations thereof. In some embodiments, the nanoparticle is a polystyrene nanoparticle. The nanoparticle can also be a derivatized polystyrene nanoparticle. For example, the nanoparticle can be a sodium dodecyl sulfate derivatized polystyrene nanoparticle.

In some embodiments, the nanoparticle includes a metal oxide. For example, the nanoparticle can include a metal oxide selected from the group consisting of an iron oxide, a nickel oxide, a cobalt oxide, a magnetite, a ferrite, and combinations thereof. The nanoparticle can include a metal oxide including an atom selected from the group consisting of Zn, Cr, Co, Dy, Er, Eu, Gd, Gd, Pr, Nd, In, Pr, Sm, Tb, Tm, and combinations thereof. In some embodiments, the nanoparticle includes a superparamagnetic metal oxide.

DETAILED DESCRIPTION

Figure 1:
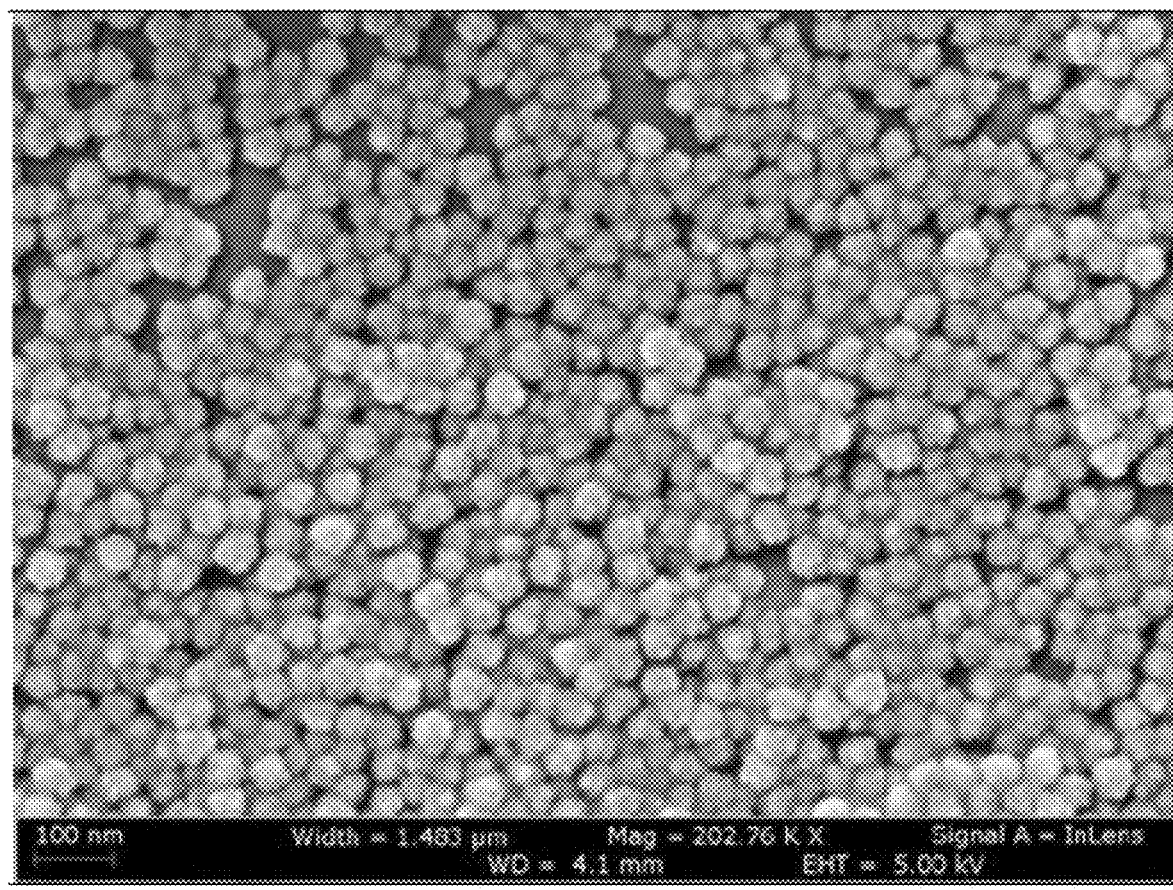
FIG. 1 shows a representative scanning electron micrographs of 45 nm PEI (polyethylenimine) coated silica nanoparticles, as provided in this disclosure.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference in this disclosure in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used in this disclosure refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, in which R can be hydrogen (in examples that include other carbon atoms) or a carbon-based moiety, and in which the carbon-based moiety can itself be further substituted.

The term "substituted" as used in this disclosure refers to an organic group as defined in this disclosure or molecule in which one or more hydrogen atoms contained therein are replaced by one or more non-hydrogen atoms. The term "functional group" or "substituent" as used in this disclosure refers to a group that can be or is substituted onto a molecule or onto an organic group. Examples of substituents or functional groups include, but are not limited to, a halogen (for example, F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

The term "alkyl" as used in this disclosure refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used in this disclosure, the term "alkyl" encompasses n-alkyl, isoalkyl, and anteisoalkyl groups as well as other branched chain forms of alkyl. Representative substituted alkyl groups can be substituted one or more times with any of the groups listed in this disclosure, for example, amino, hydroxy, cyano, carboxy, nitro, thio, alkoxy, and halogen groups.

The term "alkenyl" as used in this disclosure refers to straight and branched chain and cyclic alkyl groups as defined in this disclosure, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used in this disclosure refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used in this disclosure refers to a group containing a carbonyl moiety in which the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case in which the carbonyl carbon atom is bonded to a hydrogen, the group is a "formyl" group, an acyl group as the term is defined in this disclosure. An acyl group can include 0 to about 12-20 or 12-40 additional carbon atoms bonded to the carbonyl group. An acyl group can include double or triple bonds within the meaning in this disclosure. An acryloyl group is an example of an acyl group. An acyl group can also include heteroatoms within the meaning here. A nicotinoyl group (pyridyl-3-carbonyl) is an example of an acyl group within the meaning in this disclosure. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used in this disclosure refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined in this disclosure. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used in this disclosure refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined in this disclosure. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed in this disclosure.

The term "aralkyl" as used in this disclosure refers to alkyl groups as defined in this disclosure in which a hydrogen or carbon bond of an alkyl group is replaced with a bond to an aryl group as defined in this disclosure. Representative aralkyl groups include benzyl and phenylethyl groups and fused (cycloalkylaryl)alkyl groups such as 4-ethyl-indanyl. Aralkenyl groups are alkenyl groups as defined in this disclosure in which a hydrogen or carbon bond of an alkyl group is replaced with a bond to an aryl group as defined in this disclosure.

The term "heterocyclyl" as used in this disclosure refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C2-heterocyclyl can be a 5-ring with two carbon atoms and three heteroatoms, a 6-ring with two carbon atoms and four heteroatoms and so forth. Likewise a C4-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used in this disclosure refers to alkyl groups as defined in this disclosure in which a hydrogen or carbon bond of an alkyl group as defined in this disclosure is replaced with a bond to a heterocyclyl group as defined in this disclosure. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used in this disclosure refers to alkyl groups as defined in this disclosure in which a hydrogen or carbon bond of an alkyl group is replaced with a bond to a heteroaryl group as defined in this disclosure.

The term "alkoxy" as used in this disclosure refers to an oxygen atom connected to an alkyl group, including a cycloalkyl group, as are defined in this disclosure. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning in this disclosure. A methoxyethoxy group is also an alkoxy group within the meaning in this disclosure, as is a methylenedioxy group in a context where two adjacent atoms of a structure are substituted therewith.

The term "amine" as used in this disclosure refers to primary, secondary, and tertiary amines having, for example, the formula N(group)$_3$ in which each group can independently be H or non-H, such as alkyl, aryl, and the like. Amines include but are not limited to R—NH$_2$, for example, alkylamines, arylamines, alkylarylamines; R$_2$NH in which each R is independently selected, such as dialkylamines, diarylamines, aralkylamines, heterocyclylamines and the like; and R$_3$N in which each R is independently selected, such as trialkylamines, dialkylarylamines, alkyldiarylamines, triarylamines, and the like. The term "amine" also includes ammonium ions as used in this disclosure.

The term "amino group" as used in this disclosure refers to a substituent of the form —NH$_2$, —NHR, —NR$_2$, —NR$_3^+$, in which each R is independently selected, and protonated forms of each, except for —NR$_3^+$, which cannot be protonated. Accordingly, any compound substituted with an amino group can be viewed as an amine. An "amino group" within the meaning in this disclosure can be a primary, secondary, tertiary, or quaternary amino group. An "alkylamino" group includes a monoalkylamino, dialkylamino, and trialkylamino group.

The terms "halo," "halogen," or "halide" group, as used in this disclosure, by themselves or as part of another substituent, mean, unless otherwise stated, a fluorine, chlorine, bromine, or iodine atom.

The term "haloalkyl" group, as used in this disclosure, includes mono-halo alkyl groups, poly-halo alkyl groups in which all halo atoms can be the same or different, and per-halo alkyl groups, in which all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used in this disclosure refers to a functional group or molecule that includes carbon and hydrogen atoms. The term can also refer to a functional group or molecule that normally includes both carbon and hydrogen atoms but in which all the hydrogen atoms are substituted with other functional groups.

As used in this disclosure, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15° C. to about 28° C.

The term "standard temperature and pressure" as used in this disclosure refers to 20° C. and 101 kPa.

As used in this disclosure, "degree of polymerization" is the number of repeating units in a polymer.

As used in this disclosure, the term "polymer" refers to a molecule having at least one repeating unit and can include copolymers.

The term "copolymer" as used in this disclosure refers to a polymer that includes at least two different repeating units. A copolymer can include any suitable number of repeating units.

The term "downhole" as used in this disclosure refers to under the surface of the earth, such as a location within or fluidly connected to a wellbore.

As used in this disclosure, the term "drilling fluid" refers to fluids, slurries, or muds used in drilling operations downhole, such as during the formation of the wellbore.

As used in this disclosure, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this disclosure, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used in this disclosure, the term "fracturing fluid" refers to fluids or slurries used downhole during fracturing operations.

As used in this disclosure, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used in this disclosure, the term "completion fluid" refers to fluids or slurries used downhole during the completion phase of a well, including cementing compositions.

As used in this disclosure, the term "remedial treatment fluid" refers to fluids or slurries used downhole for remedial treatment of a well. Remedial treatments can include treatments designed to increase or maintain the production rate of a well, such as stimulation or clean-up treatments.

As used in this disclosure, the term "abandonment fluid" refers to fluids or slurries used downhole during or preceding the abandonment phase of a well.

As used in this disclosure, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used in this disclosure, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used in this disclosure, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used in this disclosure, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used in this disclosure, the term "fluid" refers to liquids and gels, unless otherwise indicated.

As used in this disclosure, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used in this disclosure, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C2-C40 fatty acid C1-C10 alkyl ester (for example, a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (for example, diesel, kerosene, napthas, and the like) mineral oil, a hydrocarbon oil, a hydrocarbon including an aromatic carbon-carbon bond (for example, benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (for example, cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more Methods of Treating a Subterranean Formation with Coated Nanoparticle Compositions.

Provided in this disclosure is a method of treating a subterranean formation. The method includes placing in a subterranean formation a composition including a coated nanoparticle and an ion. The coated nanoparticle includes a nanoparticle, a linker, and a stabilizing group. The linker includes an anchoring group, a spacer, and a terminal group. Further, the anchoring group is covalently bound to the nanoparticle and at least one of the terminal groups is covalently bound to at least one stabilizing group.

In some embodiments, the composition further includes an aqueous liquid. The aqueous liquid can include at least one of water, brine, produced water, flowback water, bracking water, Arab-D-brine, fresh water, mineral waters, sea water, and other waters of varying salinity and mineral concentration. The aqueous liquid can include at least one of a drilling fluid, a fracturing fluid, a diverting fluid, and a lost circulation treatment fluid.

In some embodiments, method further includes obtaining or providing the composition, in which the obtaining or providing of the composition occurs above-surface. In some embodiments, the method further includes obtaining or providing the composition, in which the obtaining or providing of the composition occurs in the subterranean formation. For example, the composition can be provided or obtained in the subterranean formation by providing the coated nanoparticles from one source and prior to, during, or after providing the coated nanoparticles, the ion can be provided from a separate source. For example, the ion could be initially provided in the subterranean formation in an aqueous liquid and, subsequently, the coated nanoparticles could be provided to provide or obtain the composition.

In some embodiments, the method is at least one of a method of drilling the subterranean formation, a method of fracturing the subterranean formation, a method of conformance control, a method of subsurface imaging the subterranean formation, a method of aquifer remediation in the subterranean formation.

In some embodiments, the coated nanoparticles have a lower critical solution temperature ("LCST") of greater than about 90° C., 100° C., 110° C. or greater than about 120° C. For example, the coated nanoparticles can have an LCST of greater than about 90° C.

In some embodiments, the coated nanoparticles have a hydrodynamic radius of less than about 100 nm. For example, as determined by dynamic light scattering, the coated nanoparticles of the composition can have a hydrodynamic radius of less than about 100 nm in synthetic sea water or synthetic Arab-D brine at room temperature. For example, as determined by dynamic light scattering, the coated nanoparticles of the composition can have a hydrodynamic radius of less than about 100 nm, 90 nm, 80 nm, 70 nm, 60 nm, 50 nm or less than about 40 nm in sea water or Arab-D brine in room temperature.

In some embodiments, the coated nanoparticles, when at a concentration of about 500 ppm, 1,000 ppm, 1,500 ppm, 2,000 ppm, 3,000 ppm, or about 4,000 ppm in synthetic sea water, have a hydrodynamic radius of less than about 250 nm after heating at 90° C. in the synthetic sea for 8 days, as measured by dynamic light scattering. In some embodiments, the coated nanoparticles, when at a concentration of about 2,000 ppm in synthetic sea water, have a hydrodynamic radius of less than about 250 nm after heating at 90° C. in the synthetic sea water for 8 days, as measured by dynamic light scattering. In some embodiments, the coated nanoparticles, when at a concentration of about 1,000 ppm in synthetic sea water, have a hydrodynamic radius of less than about 250 nm after heating at 90° C. in the synthetic sea water for 8 days, as measured by dynamic light scattering. In some embodiments, the coated nanoparticles, when at a concentration of about 500 ppm, 1,000 ppm, 1,500 ppm, 2,000 ppm, 3,000 ppm, or about 4,000 ppm in synthetic Arab-D brine, have a hydrodynamic radius of less than about 250 nm after heating at 90° C. in the synthetic Arab-D brine for 8 days, as measured by dynamic light scattering. Synthetic sea water and synthetic Arab-D brine are described in Table 1. In some embodiments, the coated nanoparticles, when at a concentration of about 2,000 ppm in synthetic Arab-D brine have a hydrodynamic radius of less than about 250 nm after heating at 90° C. in the synthetic Arab-D brine for 8 days, as measured by dynamic light scattering. In some embodiments, the coated nanoparticles, when at a concentration of about 1,000 ppm in synthetic Arab-D brine have a hydrodynamic radius of less than about 250 nm after heating at 90° C. in the synthetic Arab-D brine for 8 days, as measured by dynamic light scattering. Synthetic sea water and synthetic Arab-D brine are described in Table 1.

|  | Synthetic Seawater (mol/L) | Synthetic Arab-D Brine (mol/L) |
|---|---|---|
| NaCl | 0.7022 | 1.2764 |
| $CaCl_2 \cdot 2H_2O$ | 0.0162 | 0.3387 |
| $MgCl_2 \cdot 6H_2O$ | 0.0868 | 0.0648 |
| $BaCl_2$ | 0.00 | 0.0001 |
| $Na_2SO_4$ | 0.0447 | 0.0042 |
| $NaHCO_3$ | 0.0020 | 0.00607 |
| $Na_2CO_3$ | 0.00 | 0.00 |

In some embodiments, the coated nanoparticles have a hydrodynamic radius that is less than the hydrodynamic radius of similar nanoparticles without the one or more stabilizing groups in a similar composition under similar conditions. For example, the coated nanoparticles can have a hydrodynamic radius that is less than the hydrodynamic radius of similar nanoparticles without the one or more stabilizing groups in a similar composition in water, brine, produced water, flowback water, bracking water, Arab-D-brine, fresh water, mineral waters, sea water or mixtures thereof.

In some embodiments, the nanoparticle is selected from the group consisting of a silica nanoparticle, a metal oxide nanoparticle, a superparamagnetic nanoparticle, an upconverting nanoparticle (e.g., rare earth upconverting nanoparticles), polymer-based nanoparticles such as polystyrene based nanoparticles, carbonaceous nanoparticles such as carbon black, carbon nanotubes, graphene, graphene platelets, and mixtures thereof. In some embodiments, the nanoparticle can include a metal oxide. In some embodiments, the nanoparticle includes an iron oxide, a nickel oxide, a cobalt oxide, a magnetite, a ferrite, or combinations thereof. In some embodiments, the nanoparticle is a superparamagnetic nanoparticle. Examples of superparamagnetic nanoparticles include iron oxides, such as $Fe_3O_4$ and $\gamma$-$Fe_2O_3$, pure metals, such as Fe and Co, spinel-type ferromagnets, such as $MgFe_2O_4$, $MnFe_2O_4$, and $CoFe_2O_4$, as well as alloys, such as $CoPt_3$ and FePt. In some embodiments, the nanoparticle includes a fluoride. For example, the nanoparticle can include upconverting rare earth nanoparticles such as doped YF4 nanoparticles. In some embodiments, the nanoparticle includes a metal oxide including an atom selected from the group consisting of Zn, Cr, Co, Dy, Er, Eu, Fe, Gd, Gd, Pr, Nd, Ni, In, Pr, Sm, Tb, Tm, and combinations thereof.

In some embodiments, the nanoparticle is a silica nanoparticle. For example, the nanoparticle can be a fluorescent silica nanoparticle.

When the composition includes a coated superparamagnetic nanoparticle the coated superparamagnetic nanoparticles can be used as contrast agents for electromagnetic imaging of subsurface formations. As used in this disclosure, the term "superparamagnetic nanoparticle" refers to a nanoparticle that exhibits strong paramagnetic behavior in the presence of an applied magnetic field. In some embodiments, the superparamagnetic nanoparticles can include iron oxides, such as $Fe_3O_4$ and $\gamma$-$Fe_2O_3$, pure metals, such as Fe and Co, spinel-type ferromagnets, such as $MgFe_2O_4$, $MnFe_2O_4$, and $CoFe_2O_4$, as well as alloys, such as $CoPt_3$ and FePt. For example, the nanoparticles can include a superparamagnetic iron oxide cores. Nanoparticles including a superparamagnetic core (for example, superparamagnetic nanoparticles) can exhibit strong paramagnetic behavior in the presence of an applied magnetic field. In the absence of an applied field, superparamagnetic nanoparticles can exhibit no magnetic moment. This is due to the nanometer length scale of the magnetic domains in the superparamagnetic nanoparticle. In some embodiments, these superparamagnetic nanoparticle can be used as contrast agents for electromagnetic crosswell imaging. The change in magnetic susceptibility of the composition including superparamagnetic nanoparticles provides contrast against native fluids. Consequently, the compositions described in this disclosure provides for an increase in magnetic susceptibility without a loss in colloidal stability.

In some embodiments, the nanoparticles have an average particle size of about 10 nm to about 1,000 nm. For example, the nanoparticles can have an average size of about 10 to 100 nm, 20 to 90 nm, or about 30 to 80 nm, as determined by scanning electron microscopy prior to forming the coated nanoparticle. As used in this disclosure, the term "average size" refers to the arithmetic mean of the distribution of nanoparticle sizes in a plurality of nanoparticles.

The linker includes an anchoring group, a spacer, and a terminal group.

In some embodiments, the linker spacer and terminal group includes a polyamine (e.g., polyallylamine, chitosan, and polyethylenimine). In some embodiments, the linker spacer and terminal group includes polyethylenimine. For example, the nanoparticle and covalently bound linker can be obtained by reacting trimethoxysilylpropyl modified polyethylenimine with the nanoparticle.

In some embodiments, the anchoring group is a silane that is covalently bound to the nanoparticle.

In some embodiments, the linker spacer includes the subunit:

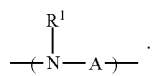

The variable $R^1$ can be selected from the from the group consisting of —H,

or a linear or branched $(C_1-C_{20})$alkyl interrupted with 0, 1, 2, 3, 4, 5, 6, 7, 8, or 9 substituted or unsubstituted nitrogen atoms. The wavy line labeled 1 indicates a point of attachment to another linker on the coated nanoparticle. The variable A can be a $(C_1-C_{10})$alkyl interrupted with 0, 1, 2, 3, or 4 oxygen atoms or substituted or unsubstituted nitrogen atoms. For example, A can be —$CH_2CH_2$—.

In some embodiments, the linker terminal group is —$OR^A$, —$SR^A$, —N—$NR^A{}_2$, O—$NR^A{}_2$, or $NR^A{}_2$. The variable $R^A$, at each occurrence can be independently selected from —H or

The wavy line labeled 2 indicates a point of attachment to the stabilizing group.

In some embodiments, the stabilizing group includes one or more of a —OH, —$CO_2H$, —$CO_2CH_3$, a phosphonate, a phosphate, a sulfonate, or a sulfate. For example, the stabilizing group can include a functional group selected from the group consisting of:

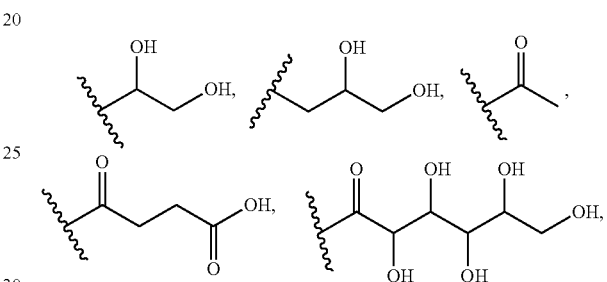

and combinations thereof. The wavy line indicates a point of attachment to the linker terminal group.

In some embodiments, the stabilizing group can be a carbohydrate. For example, the stabilizing group include at least one of a monosaccharide, an oligosaccharide, or a polysaccharide. In some embodiments, the polysaccharide is selected from the group consisting of alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (for example, hydroxypropyl guar, carboxy methyl guar, or carboxymethyl hydroxypropyl guar), gum ghatti, gum arabic, locust bean gum, cellulose, and derivatized cellulose (for example, carboxymethyl cellulose, hydroxyethyl cellulose, carboxymethyl hydroxyethyl cellulose, hydroxypropyl cellulose, or methyl hydroxy ethyl cellulose). For example, the polysaccharide can be dextran.

The polysaccharide can have an average molecular weight of about 1,000 Daltons (Da) to about 150,000 Da. For example, the polysaccharide can have an average molecular weight of about 10,000 Da to about 140,000 Da, about 30,000 Da to about 130,000 Da, 50,000 to about 120,000 Da, 70,000 Da to about 110,000 Da, or about 80,000 Da to about 100,000 Da, or about 1,000 Da, 5,000 Da, 10,000 Da, 20,000 Da, 30,000 Da, 40,000 Da, 50,000 Da, 60,000 Da, 70,000 Da, 80,000 Da, 90,000 Da, 100,000 Da, 110,000 Da, 120,000 Da, 130,000 Da, 140,000 Da, or about 150,000 Da or greater.

In some embodiments, the coated nanoparticles have a positive zeta potential.

In some embodiments, about 5% to about 95% of terminal groups are covalently bound to a stabilizing group. In some embodiments, about 5%, 10%, 15%, 20%, 25%, 30%, 35%, 40%, 45%, 50%, 55%, 60%, 65%, 70%, 75%, 80%, 85%, 90%, or about 95% of terminal groups are covalently bound to a stabilizing group. For example, about 75% of terminal groups can be covalently bound to a stabilizing group.

In some embodiments, the ion includes one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. For example, the ion can include a calcium ion.

In some embodiments, the composition includes an aqueous liquid and an ion. The ion can be present at a concentration of about 0.05 M to about 2 M. For example, the ion can be present at a concentration of about 0.05 M, 0.06 M, 0.07 M, 0.08 M, 0.09 M, 0.1 M, 0.2 M, 0.3 M, 0.4 M, 0.5 M, 0.6 M, 0.7 M, 0.8 M, 0.9 M, 1.0 M, 1.5 M, or about 2 M. In some embodiments, the ion can be present at a concentration of about 0.05 M to about 0.3 M. For example, the ion can be present at a concentration of about 0.05 M, 0.06 M, 0.07 M, 0.08 M, 0.09 M, 0.1 M, 0.2 M, or about 0.3 M. In some embodiments, the ion can be present at a concentration of about 0.6 M to about 0.9 M. For example, the ion can be present at a concentration of about 0.6 M, 0.7 M, 0.8 M, or about 0.9 M.

In some embodiments, the composition includes sea water and a calcium ion where the calcium ion is present at a concentration at a concentration of about 0.05 M to about 0.3 M. For example, the ion can be present at a concentration of about 0.05 M, 0.06 M, 0.07 M, 0.08 M, 0.09 M, 0.1 M, 0.2 M, or about 0.3 M.

The ions present in the composition can be closely associated with the stabilizing groups. For example, the ions present in the composition can be bound to the stabilizing groups through non-covalent interactions such as through Van der Waals forces. Further, the ions present in the composition can be bound to the stabilizing groups through coordinated binding.

In some embodiments, the providing or obtaining the composition includes determining the presence and concentration of at least one ion of a water in a subterranean formation and doping the composition with the determined ion. For example, the composition can be doped with at least one ion found in a water of a subterranean formation such that the molarity of the ion in the composition is at least 5%, 10%, 15%, 20%, 25%, 30%, 35%, 40%, 45%, 50%, 55%, 60%, 70%, 75%, 80%, 85%, 90% or at least 95% of the molarity of the ion found in the water of the subterranean formation.

In some embodiments, the composition further includes a kosmotropic ion. In some embodiments, the method further includes aggregating and precipitating the coated nanoparticles in the subterranean formation by the addition of a kosmotropic ion, such as a sulfate, a phosphate, $Mg^{2+}$, $Li^+$, or any other suitable kosmotropic ion. In some embodiments, the method is a method of fluid diversion and further includes aggregating, or aggregating and precipitating, the coated nanoparticles in the subterranean formation by the addition of a kosmotropic ion. In some embodiments, the method is a method of conformance control and further includes aggregating, or aggregating and precipitating, of the coated nanoparticles in the subterranean formation by the addition of a kosmotropic ion. For example, after the composition has been placed in the subterranean formation a kosmotropic ion may be added to the composition. Addition of the kosmotropic ion can lead to aggregation, or aggregation and precipitation, of the coated nanoparticles in the subterranean formation. Such, compositions including kosmotropic ions are useful in fluid diversion or conformance control.

As used in this disclosure, the term "kosmotropic ion" refers to ions that contribute to the stability and structure of water-water interactions. Kosmotropes typically cause water molecules to favorably interact, which also stabilizes intermolecular interactions in macromolecules. Examples of ionic kosmotropic ions include sulfate, phosphate, $Mg^{2+}$, $Li^+$, and any other suitable substance. Based on free energy of hydration ($\Delta G_{hydr}$) of the salts, an increasing negative $\Delta G_{hydr}$, results in a more kosmotropic the salt, for example. Other suitable kosmotropes may include a sulfate, phosphate, hydrogenphosphate salt, ammonium sulfate, sodium sulfate, citrates, oxalates, and any other order increasing substance. The counterion may include Group IA metal ions, Group IIA metal ions, ammonium ions, and other suitable ions.

In some embodiments, the composition further includes a chaotropic ion, such as urea, guanidinium chloride, lithium perchlorate, or any other suitable chaotropic ion. In some embodiments, the method further includes aggregating the coated nanoparticles at an oil-water interface. For example, the coated nanoparticles can be aggregated at one or more oil-water interfaces by the addition of a chaotropic ion, such as urea, guanidinium chloride, lithium perchlorate, and any other suitable chaotropic ion.

As used in this disclosure, the term "chaotripoc ion" refers to ions that disrupt the three dimensional structure of water. Chaotropes typically interfere with stabilizing intra-molecular interactions mediated by non-covalent forces, such as hydrogen bonds, Van der Waals forces, and hydrophobic effects. Examples of chaotropes include urea, guanidinium chloride, and lithium perchlorate.

In some embodiments, the composition further includes a counterion. For example, the counterion can be a halide, such as fluoro, chloro, iodo, or bromo. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate.

In some embodiments, the method further includes combining the composition with an aqueous or oil-based fluid including a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, a imaging fluid or a combination thereof, to form a mixture, in which the placing the composition in the subterranean formation includes placing the mixture in the subterranean formation. When the composition is combined with an oil-based fluid, the composition can form emulsions.

In some embodiments, at least one of prior to, during, and after the placing of the composition in the subterranean formation, the composition is used in the subterranean formation, at least one of alone and in combination with other materials, as a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, an imaging fluid, or a combination thereof.

In some embodiments, the composition further includes a saline, an aqueous base, an oil, an organic solvent, a synthetic fluid oil phase, an aqueous solution, an alcohol or a polyol, a cellulose, a starch, an alkalinity control agent, an acidity control agent, a density control agent, a density modifier, an emulsifier, a dispersant, a polymeric stabilizer, a crosslinking agent, a polyacrylamide, a polymer, an antioxidant, a heat stabilizer, a foam control agent, a foaming agent, a solvent, a diluent, a plasticizer, a filler, an inorganic particle, a pigment, a dye, a precipitating agent, a rheology modifier, an oil-wetting agent, a set retarding additive, a surfactant, a corrosion inhibitor, a gas, a weight reducing additive, a heavy-weight additive, a lost circulation material, a filtration control additive, a salt, a fiber, a thixotropic additive, a breaker, a crosslinker, a gas, a rheology modifier, a curing accelerator, a curing retarder, a pH modifier, a chelating agent, a scale inhibitor, an enzyme, a resin, a water control material, a polymer, an oxidizer, a marker, a Portland cement, a pozzolana cement, a gypsum cement, a high alumina content cement, a slag cement, a silica cement, a fly ash, a metakaolin, a shale, a zeolite, a crystalline silica compound, an amorphous silica, a fiber, a hydratable clay, a microsphere, a pozzolan lime, or combinations thereof.

In some embodiments, placing the composition in the subterranean formation includes fracturing at least part of the subterranean formation to form at least one subterranean fracture.

In some embodiments, the composition further includes a proppant, a resin-coated proppant, or a combination thereof.

In some embodiments, the placing of the composition in the subterranean formation includes pumping the composition through a drill string disposed in a wellbore, through a drill bit at a downhole end of the drill string, and back above-surface through an annulus. The method can further include, processing the composition exiting the annulus with at least one fluid processing unit to generate a cleaned composition and recirculating the cleaned composition through the wellbore.

Also, provided in this disclosure is a method of treating a subterranean formation, the method including (i) placing in a subterranean formation a composition including (a) a coated nanoparticle including a nanoparticle, a linker, and a stabilizing group and (b) a calcium ion. The linker includes a silane anchoring group and polyethylenimine. The stabilizing group includes a propyl 1,2 diol. Further, the linker is covalently bound to the nanoparticle and at least one amine of the polyethylenimine is covalently bound to the propyl 1,2 diol stabilizing group.

In some embodiments, the composition includes sea water and the calcium ion is present at a concentration at a concentration of about 0.05 M to about 0.3 M. For example, the ion can be present at a concentration of about 0.05 M, 0.06 M, 0.07 M, 0.08 M, 0.09 M, 0.1 M, 0.2 M, or about 0.3 M.

Also, provided in this disclosure is a method of treating a subterranean formation, the method including (i) placing in a subterranean formation a composition including (a) a coated nanoparticle including a silica nanoparticle, a linker, and a stabilizing group, and (b) a calcium ion. The linker includes a silane anchoring group and polyethylenimine. The stabilizing group includes a propyl 1,2 diol. Further, the linker is covalently bound to the nanoparticle and at least one amine of the polyethylenimine is covalently bound to the propyl 1,2 diol stabilizing group.

In some embodiments, the composition includes sea water and the calcium ion is present at a concentration at a concentration of about 0.05 M to about 0.3 M. For example, the ion can be present at a concentration of about 0.05 M, 0.06 M, 0.07 M, 0.08 M, 0.09 M, 0.1 M, 0.2 M, or about 0.3 M.

Compositions Including a Coated Nanoparticle.

Also, provided in this disclosure is a coated nanoparticle composition including (i) a coated nanoparticle including a nanoparticle, a linker, and a stabilizing group and (ii) an ion. The linker includes a silane anchoring group, a spacer, and a terminal group. Further, the silane anchoring group is covalently bound to the nanoparticle core and at least one of the terminal groups is covalently bound to at least one stabilizing group.

In some embodiments, the composition further includes an aqueous liquid including one or more of water, brine, produced water, flowback water, brackish water, fresh water, Arab-D-brine, sea water, mineral waters, and other waters of varying salinity and mineral concentration.

In some embodiments, the nanoparticle is selected from the group consisting of a silica nanoparticle, a metal oxide nanoparticle, an upconverting nanoparticle, a superparamagnetic nanoparticle, and mixtures thereof. The nanoparticle can be a silica nanoparticle. The linker can include polyethylenimine. The stabilizing group can include a functional group selected from the group consisting of:

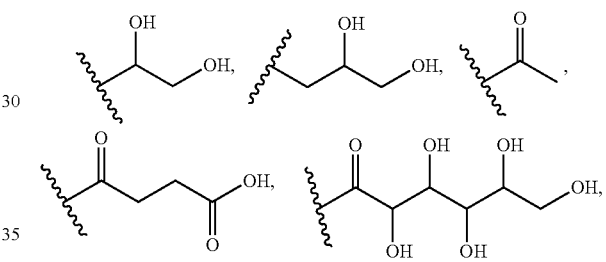

and combinations thereof. The wavy line indicates a point of attachment to the linker terminal group.

The ion can include one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. For example, the ion can include a calcium ion.

In some embodiments, the ion is a calcium ion and is present in the aqueous liquid at a concentration at a concentration of about 0.05 M to about 0.3 M. For example, the ion can be present at a concentration of about 0.05 M, 0.06 M, 0.07 M, 0.08 M, 0.09 M, 0.1 M, 0.2 M, or about 0.3 M.

Also provided in this disclosure, is a coated nanoparticle composition including (i) a coated nanoparticle including a silica nanoparticle, a linker, and a stabilizing group, and (ii) a calcium ion. The linker includes a silane anchoring group and polyethylenimine. The stabilizing group includes a propyl 1,2 diol. Further, the linker is covalently bound to the nanoparticle and at least one amine of the polyethylenimine is covalently bound to the propyl 1,2 diol stabilizing group Coated Nanoparticles.

Also provided in this disclosure, is a coated nanoparticle including (i) a nanoparticle, (ii) a linker including an anchoring group, a spacer, and a terminal group, and (iii) a stabilizing group. The anchoring group is covalently bound to the nanoparticle core and at least one of the terminal groups is covalently bound to the stabilizing group.

Also provided in this disclosure is a coated nanoparticle including a nanoparticle, a linker, and a stabilizing group. The linker includes a silane anchoring group and polyethylenimine. The stabilizing group can include a functional group selected from the group consisting of:

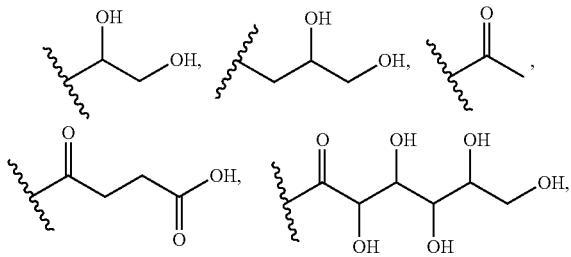

and combinations thereof.

Also provided in this disclosure is a coated nanoparticle including (i) a silica nanoparticle (ii) a linker including a silane anchoring group and polyethylenimine, and (iii) a stabilizing group including propyl 1,2 diol. The linker is covalently bound to the nanoparticle and at least one amine of the polyethylenimine is covalently bound to the propyl 1,2 diol stabilizing group.

Methods of Treating a Subterranean Formation with Crosslinked-Coated Nanoparticle Compositions Also provided herein is a method of treating a subterranean formation. The method includes placing in placing in a subterranean formation a composition including an ion and a crosslinked-coated nanoparticle. The crosslinked-coated nanoparticle includes a nanoparticle and a coating. The coating includes a linker, a crosslinker, and a stabilizing group.

In some embodiments, the ion includes one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. For example, the ion can include a calcium ion.

In some embodiments, the linker is crosslinked by a crosslinker. For example, one or more linkers surrounding a nanoparticle can be crosslinked with a crosslinker, such as a bis-epoxide. Crosslinking one or more linkers surrounding a nanoparticle with a crosslinker can ensure the one or more linkers remain associated with the nanoparticle.

In some embodiments, the stabilizing group is covalently bound to the linker. For example, a propyl 1,2 diol stabilizing group can be installed by reacting a polyethylenimine linker with glycidol.

In some embodiments, the linker is crosslinked with the crosslinker and the linker is covalently bound to the stabilizing group. For example, the linker can be crosslinked with a a bis-epoxide, such as 1,4-butanediol diglycidyl ether, and, subsequently, the crosslinked linker can be reacted with glycidol to install propyl 1,2 diol stabilizing groups.

The linker can include the subunit:

At each occurrence, the variable $R^1$ can be independently selected from the from the group consisting of —H,

or a linear or branched ($C_1$-$C_{20}$)alkyl interrupted with 0, 1, 2, 3, 4, 5, 6, 7, 8, or 9 substituted or unsubstituted nitrogen atoms. The wavy line labeled 1 can indicate a point of attachment to another linker on the crosslinked-coated nanoparticle. At each occurrence, the variable A can be independently selected from a ($C_1$-$C_{10}$)alkyl interrupted with 0, 1, 2, 3, or 4 oxygen atoms or substituted or unsubstituted nitrogen atoms.

In some embodiments, the linker terminal group is —$OR^A$, —$SR^A$, —N—$NR^A{}_2$, O—$NR^A{}_2$, or $NR^A{}_2$. The variable $R^A$, at each occurrence can be independently selected from —H or

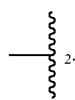

The wavy line labeled 2 indicates a point of attachment to the stabilizing group.

In some embodiments the linker includes polyethylenimine. For example the linker can be a polyethylenimine with a weight-average MW ($M_w$) of about 500 Da, 1,000 Da, 2,000 Da, 5,000 Da, 10,000 Da, 15,000 Da, 20,000 Da, 25,000 Da, 30,000 Da, 40,000 Da, or a $M_w$ of about 50,000 Da. In some embodiments, the linker is polyethylenimine with a $M_w$ of about 25,000 Da.

The crosslinker can be an amine-reactive compound, such as a polyfunctional amine-reactive compound. The polyfunctional amine-reactive compound polyfunctional amine-reactive compound can be an a substituted or unsubstituted dihaloalkane, a substituted or unsubstituted aralkyl dihalide, a substituted or unsubstituted alkylene diester, a substituted or unsubstituted aryl diester, a substituted or unsubstituted aralkyl diester, a substituted or unsubstituted alkylene diacylhalide, a substituted or unsubstituted aryl diacylhalide, a substituted or unsubstituted aralkyl diacylhalide, a substituted or unsubstituted dialdehyde, a substituted or unsubstituted diepoxyalkane, a substituted or unsubstituted epihalohydrins, or a substituted or unsubstituted aralkyl diepoxide. For example, the polyfunctional amine-reactive compound can include a diisocyanate, an epichlorohalohydrin, a triglycidyl ether, aromatic and aliphatic dialdehydes, bis(imido esters), bis(succinimidyl esters), diacid chloride, bis(acrylamides), dicarboxylic acids, or bis(enones).

The crosslinker can be a crosslinker that includes an epoxide functional group. For example, the crosslinker can be a bis-epoxide. In some embodiments, the bis-epoxide crosslinker is a diglycidyl ether. The diglycidyl ether can be include a 1,4-butanediol diglycidyl ether, a poly(ethylene glycol) diglycidyl ether, a neopentyl glycol diglycidyl ether, a glycerol diglycidyl ether, a 1,4-Cyclohexanedimethanol diglycidyl ether, a resorcinol diglycidyl ether, a poly(propylene glycol) diglycidyl ether, a bisphenol A diglycidyl ether, diglycidyl ether ($C_6H_{10}O_3$), a 1,2-propanediol diglycidyl ether, 1,4-butanediyl diglycidyl ether, or combinations thereof. In some embodiments, the diglycidyl ether is 1,4-butanediol diglycidyl ether.

The stabilizing group can include one or more of the following functional groups: a —OH, a —$CO_2H$, a —$CO_2CH_3$, a phosphate, and a sulfate. For example, the stabilizing group can include a functional group selected from the group consisting of:

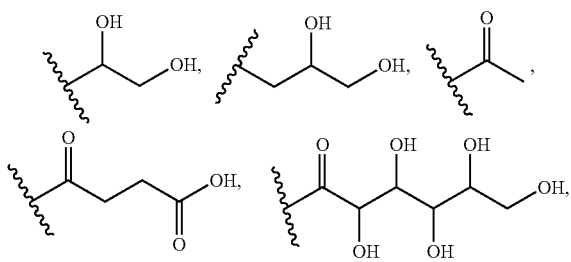

and combinations thereof. In some embodiments, the stabilizing group is a propyl 1,2 diol.

In some embodiments, the stabilizing group can be a carbohydrate. For example, the stabilizing group include at least one of a monosaccharide, an oligosaccharide, or a polysaccharide. In some embodiments, the polysaccharide is selected from the group consisting of alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (for example, hydroxypropyl guar, carboxy methyl guar, or carboxymethyl hydroxypropyl guar), gum ghatti, gum arabic, locust bean gum, cellulose, and derivatized cellulose (for example, carboxymethyl cellulose, hydroxyethyl cellulose, carboxymethyl hydroxyethyl cellulose, hydroxypropyl cellulose, or methyl hydroxy ethyl cellulose). For example, the polysaccharide can be dextran.

The polysaccharide can have an average molecular weight of about 1,000 Daltons (Da) to about 150,000 Da. For example, the polysaccharide can have an average molecular weight of about 10,000 Da to about 140,000 Da, about 30,000 Da to about 130,000 Da, 50,000 to about 120,000 Da, 70,000 Da to about 110,000 Da, or about 80,000 Da to about 100,000 Da, or about 1,000 Da, 5,000 Da, 10,000 Da, 20,000 Da, 30,000 Da, 40,000 Da, 50,000 Da, 60,000 Da, 70,000 Da, 80,000 Da, 90,000 Da, 100,000 Da, 110,000 Da, 120,000 Da, 130,000 Da, 140,000 Da, or about 150,000 Da or greater.

In some embodiments, the crosslinked-coated nanoparticles have a positive zeta potential.

The nanoparticle can be a silica nanoparticle, a polymeric nanoparticle, a metal oxide nanoparticle, an upconverting nanoparticle, a superparamagnetic nanoparticle, and mixtures thereof. In some embodiments, the nanoparticle is a polystyrene nanoparticle. For example, the nanoparticle can be a derivatized polystyrene nanoparticle, such as a sodium dodecyl sulfate (SDS) derivatized polystyrenic nanoparticle.

In some embodiments, the nanoparticle's surface is non-covalently bound to the linker. For example, the linker can electrostatically adsorb on the surface of the nanoparticle. Electrostatic adsorption of a linker on the surface of a nanoparticle can be accomplished by employing a nanoparticle with a charged surface and a linker including oppositely charged functional groups. For example, a polyethylenimine linker can be adsorbed on the surface of a negatively charged nanoparticle surface, such as a nanoparticle having a sodium dodecyl sulfate derivatized surface.

In some embodiments, the nanoparticle is selected from the group consisting of a silica nanoparticle, a metal oxide nanoparticle, a superparamagnetic nanoparticle, an upconverting nanoparticle (e.g., rare earth upconverting nanoparticles), polymer-based nanoparticles such as polystyrene based nanoparticles, carbonaceous nanoparticles such as carbon black, carbon nanotubes, graphene, graphene platelets, and mixtures thereof. In some embodiments, the nanoparticle can include a metal oxide. In some embodiments, the nanoparticle includes an iron oxide, a nickel oxide, a cobalt oxide, a magnetite, a ferrite, or combinations thereof. In some embodiments, the nanoparticle is a superparamagnetic nanoparticle. Examples of superparamagnetic nanoparticles include iron oxides, such as $Fe_3O_4$ and $\gamma$-$Fe_2O_3$, pure metals, such as Fe and Co, spinel-type ferromagnets, such as $MgFe_2O_4$, $MnFe_2O_4$, and $CoFe_2O_4$, as well as alloys, such as $CoPt_3$ and FePt. In some embodiments, the nanoparticle includes a fluoride. For example, the nanoparticle can include upconverting rare earth nanoparticles such as doped YF4 nanoparticles. In some embodiments, the nanoparticle includes a metal oxide including an atom selected from the group consisting of Zn, Cr, Co, Dy, Er, Eu, Fe, Gd, Gd, Pr, Nd, Ni, In, Pr, Sm, Tb, Tm, and combinations thereof.

In some embodiments, the nanoparticles have an average particle size of about 5 nm to about 1,000 nm. For example, the nanoparticles can have an average size of about 10 to 100 nm, 10 to 50 nm, or about 10 to 20 nm, as determined by scanning electron microscopy prior to forming the cross-linked-coated nanoparticles. In some embodiments, the nanoparticles have an average particle size of about 5 nm, 10 nm, 15 nm, 20 nm, 25 nm, 30 nm, 50 nm, 75 nm, 100 nm, 150 nm, 200 nm, or about 250 nm. For example, the nanoparticles can have an average size of about 15 nm.

In some embodiments, the composition further includes an aqueous liquid. The aqueous liquid can include at least one of water, brine, produced water, flowback water, bracking water, Arab-D-brine, fresh water, mineral waters, sea water, and other waters of varying salinity and mineral concentration. The aqueous liquid can include at least one of a drilling fluid, a fracturing fluid, a diverting fluid, an injection fluid, and a lost circulation treatment fluid.

In some embodiments, method further includes obtaining or providing the composition, in which the obtaining or providing of the composition occurs above-surface. In some embodiments, the method further includes obtaining or providing the composition, in which the obtaining or providing of the composition occurs in the subterranean formation. For example, the composition can be provided or obtained in the subterranean formation by providing the crosslinked-coated nanoparticles from one source and prior to, during, or after providing the crosslinked-coated nanoparticles, the ion can be provided from a separate source. For example, the ion could be initially provided in the subterranean formation in an aqueous liquid and, subsequently, the crosslinked-coated nanoparticles could be provided to provide or obtain the composition.

In some embodiments, the method is at least one of a method of drilling the subterranean formation, a method of fracturing the subterranean formation, a method of conformance control, a method of subsurface imaging the subterranean formation, a method of aquifer remediation in the subterranean formation.

In some embodiments, the crosslinked-coated nanoparticles have a hydrodynamic radius that is less than the hydrodynamic radius of similar nanoparticles without the cross-linked coating in a similar composition under similar conditions. For example, the crosslined-coated nanoparticles can have a hydrodynamic radius that is less than the hydrodynamic radius of similar nanoparticles without the cross-linked-coating in a similar composition in water, brine, produced water, flowback water, bracking water, Arab-D-brine, fresh water, mineral waters, sea water or mixtures thereof.

The crosslinked-coated nanoparticles, when at a concentration of about 1,000 ppm in synthetic sea water, can have a hydrodynamic radius of less than about 250 nm, 200 nm, 150 nm, 100 nm, 75 nm, 50 nm, 40 nm, 30 nm, 25 nm, or less than about 20 nm after heating at 90° C. in the synthetic sea water for 14 days. In some embodiments, the crosslinked-coated nanoparticles, when at a concentration of about 1,000 ppm in synthetic sea water, can have a hydrodynamic radius of less than about 30 nm after heating at 90° C. in the synthetic sea water for 14 days. For example, crosslinked-coated nanoparticles synthesized from nanoparticles having an average size of 15 nm, when at a concentration of about 1,000 ppm in synthetic sea water, can have a hydrodynamic radius of less than about 25 nm after heating at 90° C. in the synthetic sea water for 14 days. For example, In some embodiments, the composition includes an aqueous liquid and an ion. The ion can be present at a concentration of about 0.01 M to about 2 M. For example, the ion can be present at a concentration of about 0.01 M, 0.02 M, 0.03 M, 0.04 M, 0.05 M, 0.06 M, 0.07 M, 0.08 M, 0.09 M, 0.1 M, 0.2 M, 0.3 M, 0.4 M, 0.5 M, 0.6 M, 0.7 M, 0.8 M, 0.9 M, 1.0 M, 1.5 M, or about 2 M. In some embodiments, the ion can be present at a concentration of about 0.05 M to about 0.3 M. For example, the ion can be present at a concentration of about 0.05 M, 0.06 M, 0.07 M, 0.08 M, 0.09 M, 0.1 M, 0.2 M, or about 0.3 M. In some embodiments, the ion can be present at a concentration of about 0.6 M to about 0.9 M. For example, the ion can be present at a concentration of about 0.6 M, 0.7 M, 0.8 M, or about 0.9 M.

In some embodiments, the composition includes sea water and a calcium ion where the calcium ion is present at a concentration at a concentration of about 0.01 M to about 0.3 M. For example, the ion can be present at a concentration of about 0.01 M, 0.02 M, 0.03 M, 0.04 M, 0.05 M, 0.05 M, 0.06 M, 0.07 M, 0.08 M, 0.09 M, 0.1 M, 0.2 M, or about 0.3 M.

The ions present in the composition can be closely associated with the stabilizing groups. For example, the ions present in the composition can be bound to the stabilizing groups through non-covalent interactions such as through Van der Waals forces. Further, the ions present in the composition can be bound to the stabilizing groups through coordinated binding.

In some embodiments, the providing or obtaining the composition includes determining the presence and concentration of at least one ion of a water in a subterranean formation and doping the composition with the determined ion. For example, the composition can be doped with at least one ion found in a water of a subterranean formation such that the molarity of the ion in the composition is at least 5%, 10%, 15%, 20%, 25%, 30%, 35%, 40%, 45%, 50%, 55%, 60%, 70%, 75%, 80%, 85%, 90% or at least 95% of the molarity of the ion found in the water of the subterranean formation.

In some embodiments, the composition further includes a kosmotropic ion. In some embodiments, the method further includes aggregating and precipitating the crosslinked-coated nanoparticles in the subterranean formation by the addition of a kosmotropic ion, such as a sulfate, a phosphate, $Mg^{2+}$, $Li^+$, or any other suitable kosmotropic ion. In some embodiments, the method is a method of fluid diversion and further includes aggregating, or aggregating and precipitating, the crosslinked-coated nanoparticles in the subterranean formation by the addition of a kosmotropic ion. In some embodiments, the method is a method of conformance control and further includes aggregating, or aggregating and precipitating, of the coated nanoparticles in the subterranean formation by the addition of a kosmotropic ion. For example, after the composition has been placed in the subterranean formation a kosmotropic ion may be added to the composition. Addition of the kosmotropic ion can lead to aggregation, or aggregation and precipitation, of the crosslinked-coated nanoparticles in the subterranean formation. Such, compositions including kosmotropic ions are useful in fluid diversion or conformance control.

In some embodiments, the composition further includes a chaotropic ion, such as urea, guanidinium chloride, lithium perchlorate, or any other suitable chaotropic ion. In some embodiments, the method further includes aggregating the crosslinked-coated nanoparticles at an oil-water interface. For example, the crosslinked-coated nanoparticles can be aggregated at one or more oil-water interfaces by the addition of a chaotropic ion, such as urea, guanidinium chloride, lithium perchlorate, and any other suitable chaotropic ion.

In some embodiments, the composition further includes a counterion. For example, the counterion can be a halide, such as fluoro, chloro, iodo, or bromo. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate.

In some embodiments, the method further includes combining the composition with an aqueous or oil-based fluid including a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, a imaging fluid or a combination thereof, to form a mixture, in which the placing the composition in the subterranean formation includes placing the mixture in the subterranean formation. When the composition is combined with an oil-based fluid, the composition can form emulsions.

In some embodiments, at least one of prior to, during, and after the placing of the composition in the subterranean formation, the composition is used in the subterranean formation, at least one of alone and in combination with other materials, as a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, an imaging fluid, or a combination thereof.

In some embodiments, the composition further includes a saline, an aqueous base, an oil, an organic solvent, a synthetic fluid oil phase, an aqueous solution, an alcohol or a polyol, a cellulose, a starch, an alkalinity control agent, an acidity control agent, a density control agent, a density modifier, an emulsifier, a dispersant, a polymeric stabilizer, a crosslinking agent, a polyacrylamide, a polymer, an antioxidant, a heat stabilizer, a foam control agent, a foaming agent, a solvent, a diluent, a plasticizer, a filler, an inorganic particle, a pigment, a dye, a precipitating agent, a rheology modifier, an oil-wetting agent, a set retarding additive, a surfactant, a corrosion inhibitor, a gas, a weight reducing additive, a heavy-weight additive, a lost circulation material, a filtration control additive, a salt, a fiber, a thixotropic additive, a breaker, a crosslinker, a gas, a rheology modifier, a curing accelerator, a curing retarder, a pH modifier, a chelating agent, a scale inhibitor, an enzyme, a resin, a water control material, a polymer, an oxidizer, a marker, a Portland cement, a pozzolana cement, a gypsum cement, a high alumina content cement, a slag cement, a silica cement, a fly ash, a metakaolin, a shale, a zeolite, a crystalline silica compound, an amorphous silica, a fiber, a hydratable clay, a microsphere, a pozzolan lime, or combinations thereof.

In some embodiments, placing the composition in the subterranean formation includes fracturing at least part of the subterranean formation to form at least one subterranean fracture.

In some embodiments, the composition further includes a proppant, a resin-coated proppant, or a combination thereof.

In some embodiments, the placing of the composition in the subterranean formation includes pumping the composition through a drill string disposed in a wellbore, through a drill bit at a downhole end of the drill string, and back above-surface through an annulus. The method can further include, processing the composition exiting the annulus with at least one fluid processing unit to generate a cleaned composition and recirculating the cleaned composition through the wellbore.

Crosslinked-Coated Nanoparticle Compositions

Also provided herein is a crosslinked-coated nanoparticle composition. The composition includes an ion and a crosslinked-coated nanoparticle. The crosslinked-coated nanoparticle includes a nanoparticle and a coating. The coating includes a linker, a crosslinker, and a stabilizing group.

In some embodiments, the ion includes one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. For example, the ion can include a calcium ion.

In some embodiments, the coating is non-covalently bound to the nanoparticle. For example, the coating can be electrostatically adsorbed on the nanoparticle.

The linker can be crosslinked with the crosslinker. The stabilizing group can be covalently bound to the linker. In some embodiments, the linker is crosslinked with the crosslinker and the linker is covalently bound to the stabilizing group.

In some embodiments, the linker includes the subunit:

At each occurrence, the variable $R^1$ cab be selected from the from the group consisting of —H,

or a linear or branched $(C_1-C_{20})$alkyl interrupted with 0, 1, 2, 3, 4, 5, 6, 7, 8, or 9 substituted or unsubstituted nitrogen atoms. The wavy line labeled 1 can indicate a point of attachment to another linker on the crosslinked-coated nanoparticle. At each occurrence, the variable A can be a $(C_1-C_{10})$alkyl interrupted with 0, 1, 2, 3, or 4 oxygen atoms or substituted or unsubstituted nitrogen atoms.

The linker can include a terminal group that is selected from group consisting of $OR^A{}_2$, $-SR^A{}_2$, $-N-NR^A{}_2$, $O-NR^A{}_2$, and $NR^A{}_2$. The variable $R^2$, at each occurrence, can be independently selected from —H or

The wavy line labeled 2 can indicate a point of attachment to the stabilizing group.

In some embodiments, the linker includes polyethylenimine.

The crosslinker can include an epoxide functional group. For example, the crosslinker can be a bis-epoxide. In some embodiments, the bis-epoxide is a diglycidyl ether. The diglycidyl ether can be selected from the group consisting of a 1,4-butanediol diglycidyl ether, a poly(ethylene glycol) diglycidyl ether, a neopentyl glycol diglycidyl ether, a glycerol diglycidyl ether, a 1,4-Cyclohexanedimethanol diglycidyl ether, a resorcinol diglycidyl ether, a poly(propylene glycol) diglycidyl ether, a bisphenol A diglycidyl ether, diglycidyl ether $(C_6H_{10}O_3)$, a 1,2-propanediol diglycidyl ether, 1,4-butanediyl diglycidyl ether, and combinations thereof. In some embodiments, the diglycidyl ether includes a 1,4-Butanediol diglycidyl ether.

The stabilizing group can include one or more of the following functional groups a —OH, —$CO_2H$, —$CO_2CH_3$, a phosphate, or a sulfate. In some embodiments, the stabilizing group includes a functional group selected from the group consisting of:

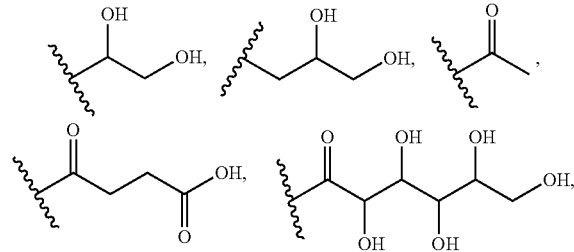

and combinations thereof.

The nanoparticle can be selected from the group consisting of a silica nanoparticle, a polymeric nanoparticle, a metal oxide nanoparticle, an upconverting nanoparticle, a superparamagnetic nanoparticle, and combinations thereof.

In some embodiments, the nanoparticle is a polystyrene nanoparticle. The nanoparticle can also be a derivatized polystyrene nanoparticle. For example, the nanoparticle can be a sodium dodecyl sulfate derivatized polystyrene nanoparticle.

In some embodiments, the nanoparticle includes a metal oxide. For example, the nanoparticle can include a metal oxide selected from the group consisting of an iron oxide, a nickel oxide, a cobalt oxide, a magnetite, a ferrite, and combinations thereof. The nanoparticle can include a metal oxide including an atom selected from the group consisting of Zn, Cr, Co, Dy, Er, Eu, Gd, Gd, Pr, Nd, In, Pr, Sm, Tb, Tm, and combinations thereof. In some embodiments, the nanoparticle includes a superparamagnetic metal oxide.

Also provided herein is a crosslinked-coated nanoparticle composition. The composition includes an ion and a crosslinked-coated nanoparticle. The crosslinked-coated nanoparticle includes a nanoparticle and a coating. The nanoparticle surface has an overall negative charge. The coating includes a polyethylene amine crosslinked with a bis-epoxide crosslinker, and a stabilizing group. In some embodiments, the stabilizing group is a propyl 1,2 diol. The propyl 1,2 diol can be installed by reacting the cross-linked polyethylenimine with glycidol.

In some embodiments, the ion includes one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion. For example, the ion can include a calcium ion.

Also provided herein is a crosslinked-coated nanoparticle composition. The composition includes a calcium ion and a crosslinked-coated nanoparticle. The crosslinked-coated nanoparticle includes a nanoparticle and a coating. The nanoparticle surface has an overall negative charge. The crosslinked-coated nanoparticle includes a nanoparticle and a coating. The coating includes a polyethylene amine crosslinked with a bis-epoxide crosslinker, and a propyl 1,2 diol stabilizing group.

Also provided herein is a crosslinked-coated nanoparticle composition. The composition includes a calcium ion and a crosslinked-coated nanoparticle. The crosslinked-coated nanoparticle includes a nanoparticle and a coating. The nanoparticle surface has an overall negative charge. The coating includes polyethylene amine crosslinked with a 1,4-butanediol diglycidyl ether crosslinker, and a propyl 1,2 diol stabilizing group.

Crosslinked-Coated Nanoparticles.

Also provided herein is a crosslinked-coated nanoparticle. The crosslinked-coated nanoparticle includes a crosslinked-coated nanoparticle comprising a nanoparticle and a coating, The coating includes a linker, a crosslinker, and a stabilizing group.

In some embodiments, the coating is non-covalently bound to the nanoparticle. For example, the coating can be electrostatically adsorbed on the nanoparticle.

The linker can be crosslinked with the crosslinker. The stabilizing group can be covalently bound to the linker. In some embodiments, the linker is crosslinked with the crosslinker and the linker is covalently bound to the stabilizing group.

In some embodiments, the linker includes the subunit:

At each occurrence, the variable $R^1$ cab be selected from the from the group consisting of —H,

or a linear or branched $(C_1$-$C_{20})$alkyl interrupted with 0, 1, 2, 3, 4, 5, 6, 7, 8, or 9 substituted or unsubstituted nitrogen atoms. The wavy line labeled 1 can indicate a point of attachment to another linker on the crosslinked-coated nanoparticle. At each occurrence, the variable A can be a $(C_1$-$C_{10})$alkyl interrupted with 0, 1, 2, 3, or 4 oxygen atoms or substituted or unsubstituted nitrogen atoms.

The linker can include a terminal group that is selected from group consisting of $OR^A_2$, $-SR^A_2$, $-N-NR^A_2$, $O-NR^A_2$, and $NR^A_2$. The variable $R^2$, at each occurrence, can be independently selected from —H or

The wavy line labeled 2 can indicate a point of attachment to the stabilizing group.

In some embodiments, the linker includes polyethylenimine.

The crosslinker can include an epoxide functional group. For example, the crosslinker can be a bis-epoxide. In some embodiments, the bis-epoxide is a diglycidyl ether. The diglycidyl ether can be selected from the group consisting of a 1,4-butanediol diglycidyl ether, a poly(ethylene glycol) diglycidyl ether, a neopentyl glycol diglycidyl ether, a glycerol diglycidyl ether, a 1,4-Cyclohexanedimethanol diglycidyl ether, a resorcinol diglycidyl ether, a poly(propylene glycol) diglycidyl ether, a bisphenol A diglycidyl ether, diglycidyl ether, a 1,2-propanediol diglycidyl ether, 1,4-butanediyl diglycidyl ether, and combinations thereof. In some embodiments, the diglycidyl ether includes a 1,4-Butanediol diglycidyl ether.

The stabilizing group can include one or more of the following functional groups a —OH, —$CO_2H$, —$CO_2CH_3$, a phosphate, or a sulfate. In some embodiments, the stabilizing group includes a functional group selected from the group consisting of:

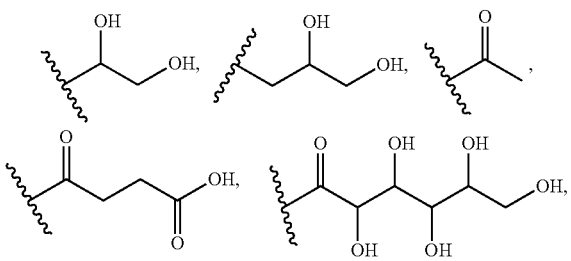

and combinations thereof.

The nanoparticle can be selected from the group consisting of a silica nanoparticle, a polymeric nanoparticle, a metal oxide nanoparticle, an upconverting nanoparticle, a superparamagnetic nanoparticle, and combinations thereof. In some embodiments, the nanoparticle is a polystyrene nanoparticle. The nanoparticle can also be a derivatized polystyrene nanoparticle. For example, the nanoparticle can be a sodium dodecyl sulfate derivatized polystyrene nanoparticle.

In some embodiments, the nanoparticle includes a metal oxide. For example, the nanoparticle can include a metal oxide selected from the group consisting of an iron oxide, a nickel oxide, a cobalt oxide, a magnetite, a ferrite, and combinations thereof. The nanoparticle can include a metal oxide including an atom selected from the group consisting of Zn, Cr, Co, Dy, Er, Eu, Gd, Gd, Pr, Nd, In, Pr, Sm, Tb, Tm, and combinations thereof. In some embodiments, the nanoparticle includes a superparamagnetic metal oxide.

Also provided herein is a crosslinked-coated nanoparticle. The crosslinked-coated nanoparticle includes a nanoparticle and a coating. The nanoparticle surface has an overall negative charge. The coating includes a polyethylene amine crosslinked with a bis-epoxide crosslinker, and a stabilizing group. In some embodiments, the stabilizing group is a propyl 1,2 diol. The propyl 1,2 diol can be installed by reacting the cross-linked polyethylenimine with glycidol.

Also provided herein is a crosslinked-coated nanoparticle. The crosslinked-coated nanoparticle includes a nanoparticle and a coating. The nanoparticle surface has an overall negative charge. The crosslinked-coated nanoparticle includes a nanoparticle and a coating. The coating includes a polyethylene amine crosslinked with a bis-epoxide crosslinker, and a propyl 1,2 diol stabilizing group.

Also provided herein is a crosslinked-coated nanoparticle. The crosslinked-coated nanoparticle includes a nanoparticle and a coating. The nanoparticle surface has an overall negative charge. The coating includes polyethylene amine crosslinked with a 1,4-butanediol diglycidyl ether crosslinker, and a propyl 1,2 diol stabilizing group.

Other Components

The composition including the nanoparticles (e.g., coated nanoparticles and crosslinked-coated nanoparticles) and the ion, can further include one or more suitable components. The additional components can be any components, such that the composition can be used as described in this disclosure.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.0001 wt % to about 10 wt % of the composition.

The viscosifier can include at least one of a linear polysaccharide, and poly(($C_2$-$C_{10}$)alkenylene), in which at each occurrence, the ($C_2$-$C_{10}$)alkenylene is independently substituted or unsubstituted. In some embodiments, the viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (for example, hydroxypropyl guar, carboxy methyl guar, or carboxymethyl hydroxylpropyl guar), gum ghatti, gum arabic, locust bean gum, and derivatized cellulose (for example, carboxymethyl cellulose, hydroxyethyl cellulose, carboxymethyl hydroxyethyl cellulose, hydroxypropyl cellulose, or methyl hydroxyl ethyl cellulose).

The viscosifier can include a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$) alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol)-poly(acrylamide) copolymer, a poly(vinylalcohol)-poly(2-acrylamido-2- methylpropanesulfonic acid) copolymer, or a poly(vinylalcohol)-poly(N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

The composition can further include a crosslinker. The crosslinker can be any suitable crosslinker. The crosslinker can be present in any suitable concentration, such as more, less, or an equal concentration as compared to the concentration of the crosslinker. In some embodiments, the crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. The composition can include any suitable proportion of the crosslinker, such as about 0.1 wt % to about 50 wt %, or about 0.1 wt % to about 20 wt %, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, or about 99 wt % or more of the composition.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (for example, any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the crosslinkable ampholyte polymer and the crosslinker, or a crosslinked reaction product thereof, in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

A water-based drilling fluid in methods provided in this disclosure can be any suitable water-based drilling fluid. In some embodiments, the drilling fluid can include at least one of water (fresh or brine), a salt (for example, calcium chloride, sodium chloride, potassium chloride, magnesium chloride, calcium bromide, sodium bromide, potassium bromide, calcium nitrate, sodium formate, potassium formate, cesium formate), aqueous base (for example, sodium hydroxide or potassium hydroxide), alcohol or polyol, cellulose, starches, alkalinity control agents, density control agents such as a density modifier (for example, barium sulfate), surfactants (for example, betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, foaming agents, solvents, diluents, plasticizers, filler or inorganic particles (for example, silica), pigments, dyes, precipitating agents (for example, silicates or aluminum complexes), and rheology modifiers such as thickeners or viscosifiers (for example, xanthan gum). Any ingredient listed in this paragraph can be either present or not present in the mixture.

An oil-based drilling fluid or mud in methods provided in this disclosure can be any suitable oil-based drilling fluid. In some embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, *Composition and Properties of Drilling and Completion Fluids* 66-67, 561-562 (5th ed. 1988). An oil-based or invert emulsion-based drilling fluid can include between about 10:90 to about 95:5, or about 50:50 to about 95:5, by volume of oil phase to water phase. A substantially all oil mud includes about 100% liquid phase oil by volume (for example, substantially no internal aqueous phase).

A pill is a relatively small quantity (for example, less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described in this disclosure as a component of a drilling fluid.

A cement fluid can include an aqueous mixture of at least one of cement and cement kiln dust. The composition including the crosslinkable ampholyte polymer and the crosslinker, or a crosslinked reaction product thereof, can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the methods described in this disclosure; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the methods described in this disclosure are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the methods described in this disclosure as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

The composition or mixture can further include a proppant such as a resin-coated proppant, an encapsulated resin, or a combination thereof. A proppant is a material that keeps an induced hydraulic fracture at least partially open during or after a fracturing treatment. Proppants can be transported into the subterranean formation and to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (for example, TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, in which particle size is the largest dimension of a particle, of about 0.001 mm (millimeters) to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.0001 wt % to about 99.9 wt %, about 0.1 wt % to about 80 wt %, or about 10 wt % to about 60 wt %, or about 0.00000001 wt % or less, or about 0.000001 wt %, 0.0001, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9 wt %, or about 99.99 wt % or more.

System or Apparatus

Also provided in this disclosure, is a system including a nanoparticle composition including a nanoparticle, an ion, and a subterranean formation including the composition therein. The nanoparticle can be a coated nanoparticle, as described in this disclosure, or a crosslinked-coated nanoparticle as describe in this disclosure.

In some embodiments, the composition in the system can also include a downhole fluid, or the system can include a mixture of the composition and downhole fluid. In some embodiments, the system can include a tubular, and a pump configured to pump the composition into the subterranean formation through the tubular.

In some embodiments, the system can include a pump fluidly coupled to a tubular (for example, any suitable type of oilfield pipe, such as pipeline, drill pipe, production tubing, and the like), the tubular containing a composition including the coated nanoparticle and the ion, described in this disclosure.

In some embodiments, the system can include a drillstring disposed in a wellbore, the drillstring including a drill bit at a downhole end of the drillstring. The system can include an annulus between the drillstring and the wellbore. The system can also include a pump configured to circulate the composition through the drill string, through the drill bit, and back above-surface through the annulus. The system can include a fluid processing unit configured to process the composition exiting the annulus to generate a cleaned drilling fluid for recirculation through the wellbore.

EXAMPLES

Example 1. Glycidylated-Polyethylenimine Silica Nanoparticles and Polyethylenimine Silica Nanoparticles Synthesis of Coated Nanoparticles Materials.

Tetraethylorthosilicate 98% (Sigma Aldrich), tetramethylrhodamine-5- (and 6)-C2, maleimide (Anaspec), L-Arginine 98% (Sigma Aldrich), (3-Mercaptopropyl) trimethoxysilane 95% (Gelest), trimethoxysilylpropyl modified (polyethylenimine) (PEI-silane), 50% in isopropanol (Gelest), glycidol (Acros Organics), tris Buffered Saline (TBS), 1× solution (pH 7.4/Molecular Biology), (Fisher BioReagents) ultrapure water.

25 nm and 45 nm Fluorescent Silica Nanoparticle Synthesis.

25 nm fluorescent silica nanoparticles "seeds" were synthesized based upon a modified protocol that was described in Hartlen et al. (*Langmuir* 2008, 24 (5), 1714-1720). The following description was for a batch synthesis of 50 mL volume. Briefly, dye precursor was prepared from reacting 20 molar excess of (3-Mercaptopropyl) trimethoxysilane with tetramethylrhodamine-5- (and 6)-$C_2$ maleimide at a dye stock concentration of 4.5 mM. For a 50 mL batch, 400 uL of dye precursor was prepared. In a round bottom (RB) flask, 40.8 mL of ultrapure water was heated to 60° C. and stirred at 150 RPM on a magnetic stir plate. 5.78 mL of 10 mg/mL L-arginine stock solution was added into the RB flask and let homogenize. On Day 1, two 100 uL aliquots of dye precursor were added into the flask followed with 675 uL of tetraethylorthosilicate (TEOS) with at least 8 hours between additions. On Day 2, the same addition of dye precursor and TEOS was repeated. On Day 3, 717 uL of TEOS was added into the RB flask and the reaction is allowed to proceed overnight.

45 nm fluorescent silica nanoparticles were synthesized using the aforementioned 25 nm seeds. For a typical 100 mL, 20 mL of 25 nm seeds was added to 80 mL of ultrapure water and heated to 60° C. and stirred at 150 RPM. 2.16 mL of 4.5 mM dye precursor and 5.4 mL TEOS will be added in 8 aliquots of 270 uL and 675 uL respectively over 8 days. On the ninth day, 1.4 mL was added to the RB flask and the reaction was allowed to proceed overnight. This yielded a 22 mg/mL suspension.

Coating 45 nm Fluorescent Silica Nanoparticles with PEI-Silane.

To coat 50 mL of 45 nm fluorescent silica nanoparticles with trimethoxysilylpropyl modified (polyethylenimine) (PEI-silane), 37.5 mL of the 50% PEI-silane solution was added to 62.5 mL ultrapure water and stirred at 900 RPM in an RB flask. Into this solution, the 45 nm nanoparticle suspension was added in 125 aliquots of 400 uL at one-minute interval between additions. At the completion of the addition, the suspension was heated to 85° C. overnight. FIG. 1 shows a representative scanning electron micrograph for 45 nm fluorescent nanoparticles after PEI-coating.

Removal of Excess PEI-Silane.

Two methods were used to remove excess PEI-silane from the reaction mixture post coating.

First, centrifugation devices with 100 kD molecular weight cut-off (MWCO) polyethersulfone (PES) membrane were employed. The suspension was loaded into the centrifugation devices and spun at 5000 RPM for 30 minutes. The filtrate was discarded and the retentate resuspended in ultrapure water. This treatment was repeated 5 times. The final retentate was reconstituted to approximately 22 mg/mL (the original nanoparticle solid content).

Alternatively, a cross-flow diafiltration with PES hollow-fiber membrane at 500 kD MWCO was employed. Typically, a 200 mL-coating batch at nominal concentration of 4.4 mg/mL as described above in "Coating 45 nm Fluorescent Silica Nanoparticles with PEI-silane" was subjected to purification with 2 L water. The feed rate was set at 30 mL/min with the trans-membrane pressure kept at approximately 1 psi. At the end of the diafiltration process, the suspension was reconcentrated to the approximately 22 mg/mL (the original nanoparticle solid content).

Glycidol Surface Modification.

10 mL aqueous suspension of 22 mg/mL PEI-coated nanoparticles were typically modified with 200 uL of technical grade glycidol at room temperature. The reaction solution was stirred rigorously and allowed to proceed overnight. The solution was then quenched with 2 mL Tris-HCl buffer solution before further purification via diafiltration as described above.

Figure 2:
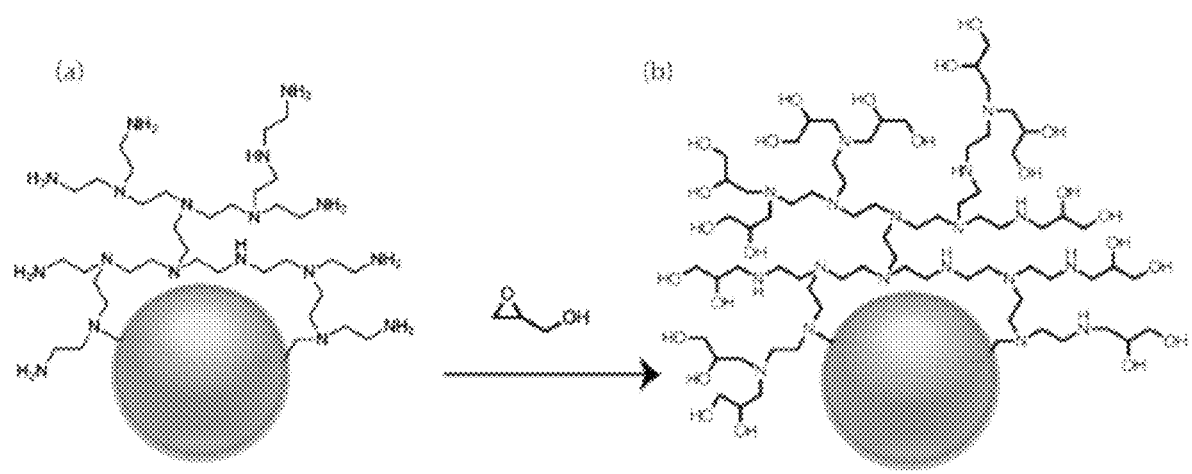
FIG. 2 shows a schematic of nanoparticle surface chemistry (a) after PEI coating and (b) glycidol modification, as provided in this disclosure.
Figure 3:
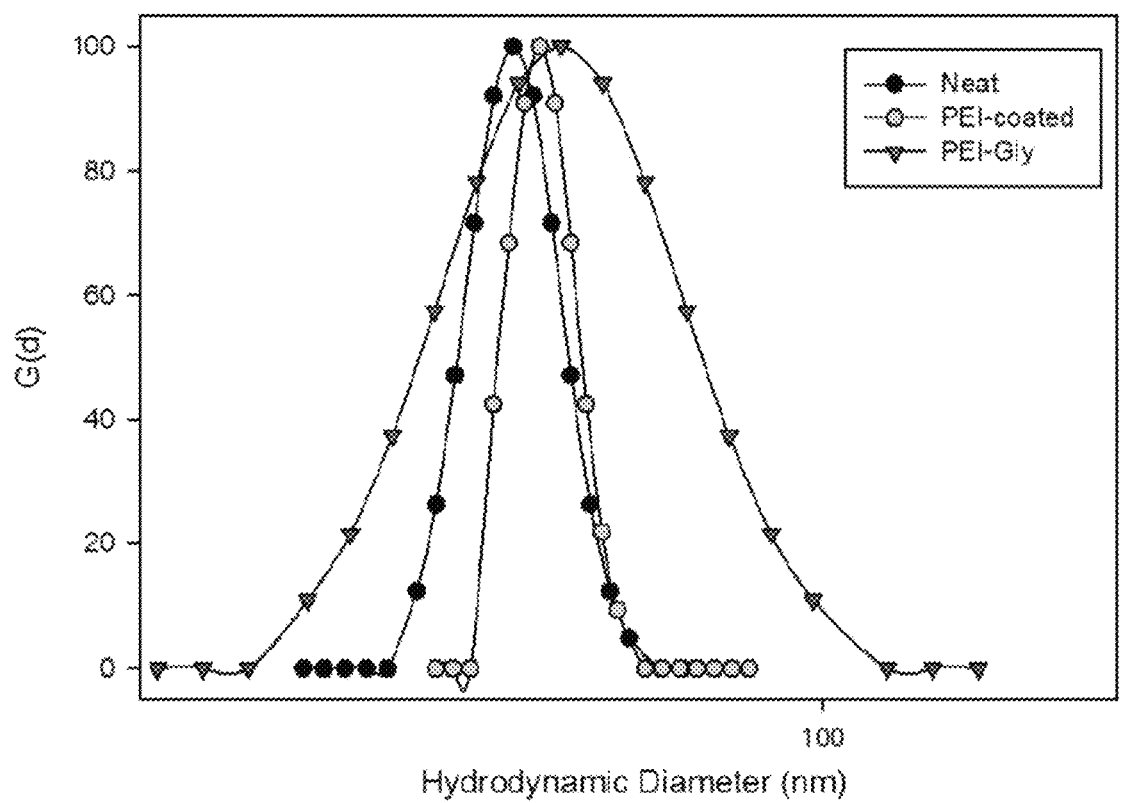
FIG. 3 shows hydrodynamic size measurements of neat, PEI-coated, and PEI-glycidylated nanoparticles indicated small increments in size with each surface modification step, as provided in this disclosure.

FIG. 2 is a schematic of the surface chemistry of the nanoparticles (a) after PEI coating and (b) after glycidol modification of PEI. Glycidylation of the PEI polymer resulted in a polyol coating on the nanoparticles. FIG. 3 depicts the hydrodynamic diameter of silica nanoparticles with neat, PEI-coated and glycidylated surfaces.

Table 2 details the synthetic brine compositions used for stimulated reservoir environment testing.

TABLE 2

| | Sea Water (mol/L) | Arab-D Brine (mol/L) |
|---|---|---|
| NaCl | 0.7022 | 1.2764 |
| $CaCl_2 \cdot 2H_2O$ | 0.0162 | 0.3387 |
| $MgCl_2 \cdot 6H_2O$ | 0.0868 | 0.0648 |
| $BaCl_2$ | 0.00 | 0.0001 |
| $Na_2SO_4$ | 0.0447 | 0.0042 |
| $NaHCO_3$ | 0.0020 | 0.00607 |
| $Na_2CO_3$ | 0.00 | 0.00 |

Colloidal Stability.

Solution Preparation. 10 mL of 1000 ppm suspensions were prepared in deionized water, synthetic seawater and Arab-D brine by diluting the stock 22,000 ppm (~22 mg/mL) solution into the brine solutions with the compositions. 5 mL was pipetted into glass pressure tubes with or without 1 g crushed Arab-D rocks. The tubes were crimped with aluminum caps with PTFE-lined septa. The remainder of the solutions was reserved as room temperature controls.

Static Stability Testing. All samples were placed in the oven at 90° C. On Day 3, samples with crushed reservoir rocks were shaken briefly. On Day 8, all samples were removed from the oven, documented photographically and characterized via dynamic light scattering and UV-Vis Spectrophotometry.

Dynamic Light Scattering (DLS). All samples were measured at 1000 ppm without filtration or dilution. For each sample, five measurements at two minutes acquisition time were taken. No adjustments in solution viscosity in the measurement parameters were made for the samples in brine. For samples with visible precipitation, DLS measurements were not performed.

UV-Vis Spectrometry. For samples that exhibited good colloidal stability, UV-Vis absorbance of the samples was taken from 250 nm to 800 nm after transferring a 1:3 dilution of the 1,000 ppm solution in either deionized, seawater or Arab-D brine into UV-transparent plastic cuvettes. Adsorption rates to crushed Arab-D rocks were calculated from absorbance maximum of tetramethylrhodamine at 550 nm.

Colloidal Stability in Arab-D Low Salinity Brine.

Photon correlation spectroscopy (dynamic light scattering) was used to measure the colloidal stability of the nanoparticles in Arab-D brine after treating the nanoparticles to 8 days at 90° C. Results indicated that PEI-coated nanoparticles have aggregated FIG. 4 (b), whereas the colloidal stability of the glycidylated PEI-coated nanoparticle was excellent over the test duration. Glycidylated nanoparticles stayed in suspension over a one-month period.

Figure 4:
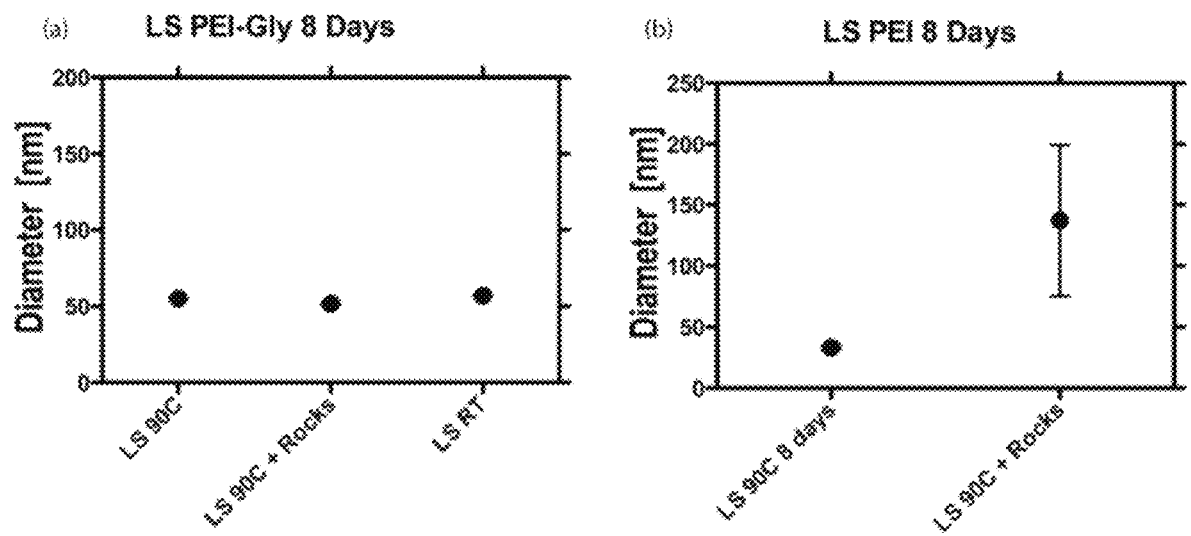
FIG. 4 shows a comparison of colloidal stability of the nanoparticles in Arab-D brine at 90° C. for 8 days showing that (a) the glycidylated nanoparticles remain stable over the testing period and (b) the PEI-coated nanoparticles have grown in size (aggregation), as provided in this disclosure.

FIG. 4 shows a comparison of colloidal stability of the nanoparticles in Arab-D brine at 90° C. for 8 days shows that the glycidylated nanoparticles remain stable over the testing period (a), whereas the (b) PEI-coated nanoparticles have grown in size (aggregation).

Adsorption to Reservoir Rocks.

To determine the propensity of the glycidylated PEI coating chemistry to adhere to carbonate reservoir rocks, a static test was performed where the nanoparticle suspension in Arab-D brine was incubated with approximately 20 wt % (1 g in 5 mL suspension) finely crushed carbonate rocks at 90° C. At the end of Day 8, the absorbance of the suspension was compared with both nanoparticles suspensions in Arab-D brine at room temperature and at 90° C. Absorbance maxima of the encapsulated dye, tetramethylrhodamine, of the three suspensions were used to determine 19% loss to rock adsorption.

Figure 5:
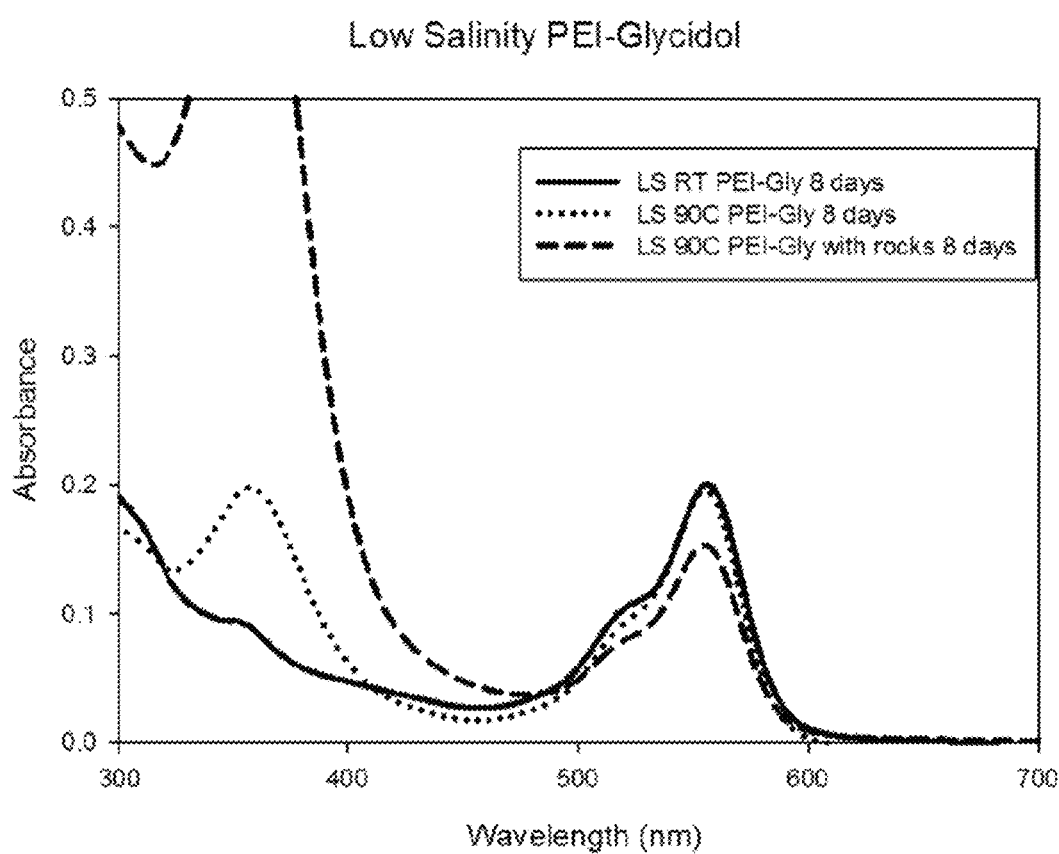
FIG. 5 shows absorbance maximum at 550 nm of tetramethylrhodamine after 8 days in Arab-D brine interfaced with finely crushed carbonate reservoir rocks.

FIG. 5 shows absorbance maximum at 550 nm of tetramethylrhodamine, the encapsulated dye, was used to quantitate rock adsorption in the static stability test. After 8 days in Arab-D brine interfaced with finely crushed carbonate reservoir rocks, a loss of 19% loss to rock adsorption was determined.

Long-Term Colloidal Stability and Minimized Rock Adhesion.

Figure 6:
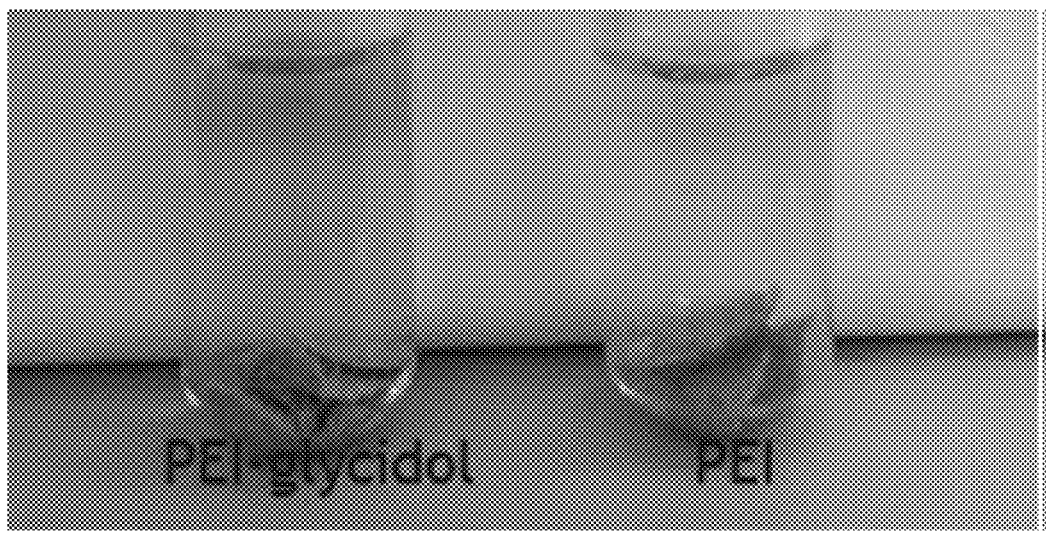
FIG. 6 shows glycidylated PEI nanoparticles after 21 days at 90° C.

FIG. 6 shows that after 21 days at 90° C., glycidylated PEI nanoparticles are still well suspended above crushed rocks whereas the PEI coated nanoparticles have fallen out of suspension.

Stability in Seawater.

Figure 7:
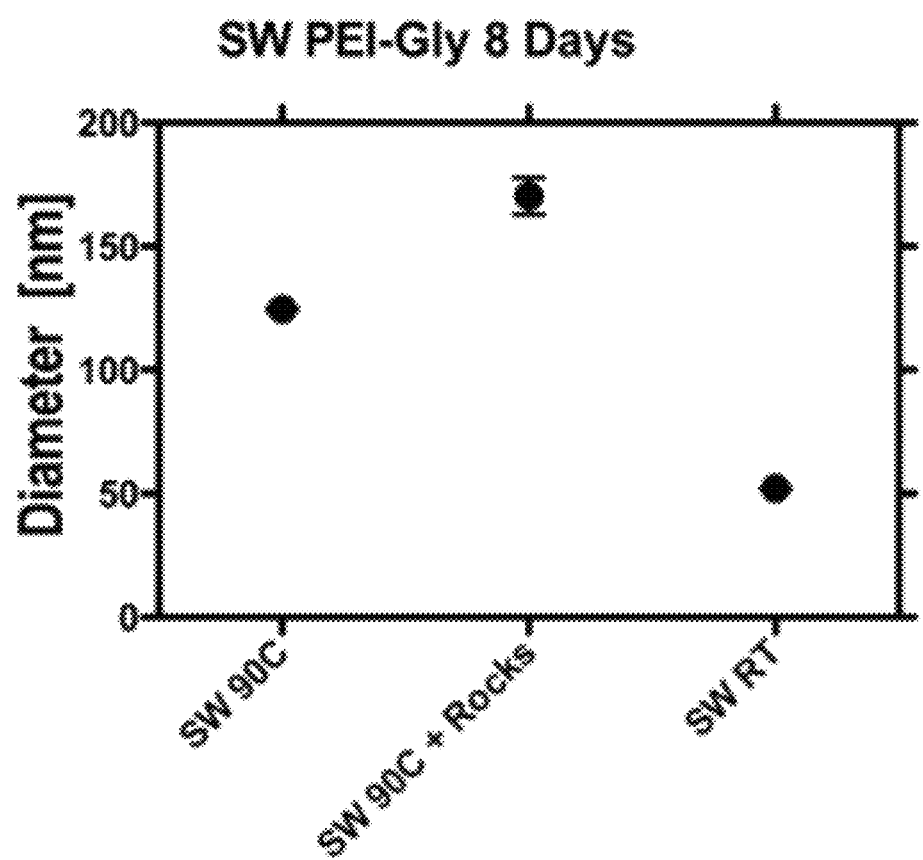
FIG. 7 shows the dynamic light scattering for glycidylated PEI-coated nanoparticles in seawater after 8 days at 90° C.
Figure 8:
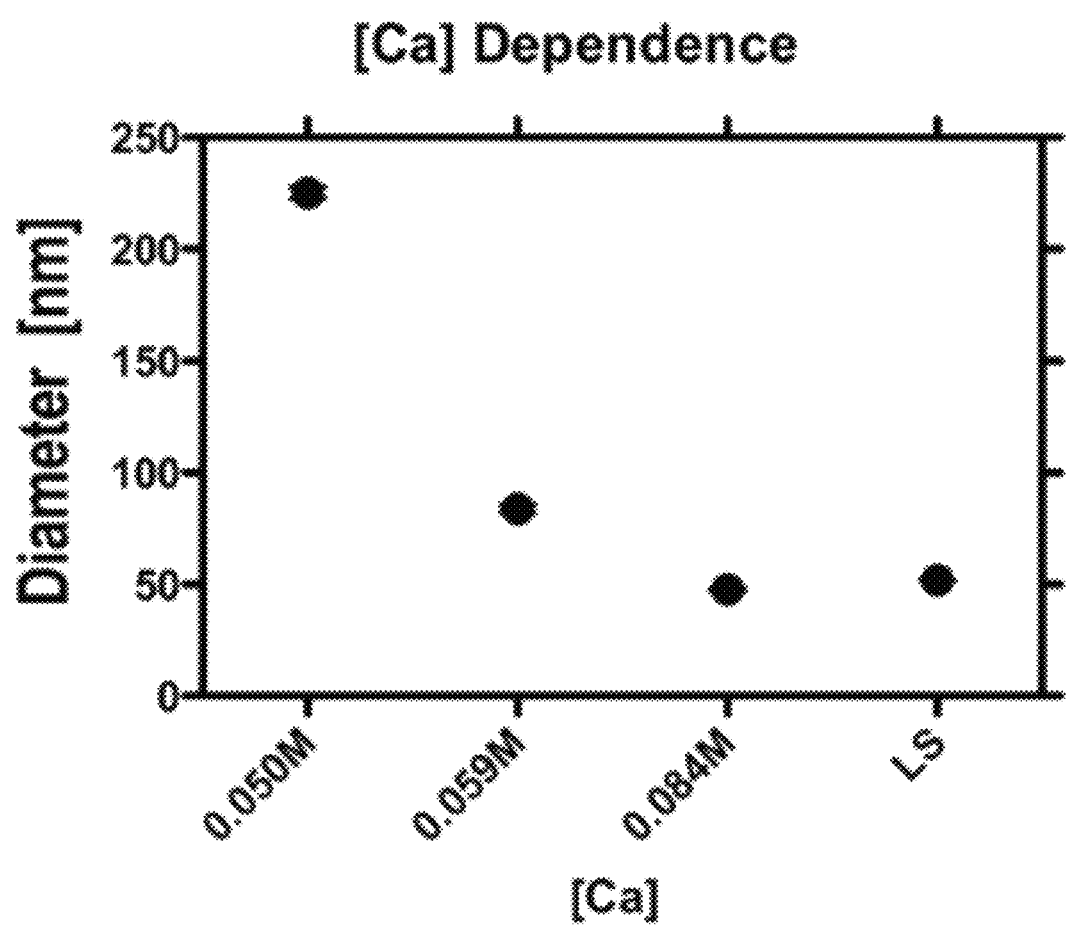
FIG. 8 shows the dynamic light scattering for glycidylated PEI-coated nanoparticle compositions doped with calcium ions in seawater after 8 days at 90° C.

During the course of the testing, it was discovered that the nanoparticles were unstable in seawater. FIG. 7 shows that after 8 days at 90° C. in seawater, the nanoparticles have aggregated (size increase). The relatively high concentration of magnesium ions and lower concentration of calcium ions in seawater were determined to be the factors in the root cause analysis. It was necessary to add a low concentration of additional calcium ions to the seawater to mitigate nanoparticle aggregation, as shown in FIG. 8. This is due to the specific ion interactions of the coating with the constituents of the brine compositions. While Arab-D brine and seawater contains similar levels of magnesium ions in its composition (Table 2), the difference in stability of the nanoparticles in seawater and Arab-D brine can be attributed to the far higher concentration (~20× molar excess) of calcium in Arab-D brine.

Due to the relatively higher concentration of sulfate ions in seawater, there is a limit to calcium ions that can be added to seawater before calcium sulfate would precipitate. In FIG. 8, the calcium concentration and nanoparticle stability is seawater was examined. Synthetic seawater was doped with varying amounts of calcium chloride at a concentration range between 0.020M and 0.084M, total calcium concentrations. There were no observable precipitates of calcium sulfate when the brines were first prepared at room temperature. At the end of the 7-day test duration, only samples with the nanoparticles still in suspension were measured. Between calcium concentration of 0.020M and 0.031M, the nanoparticles had aggregated and fallen out of suspension. At a total calcium concentration of 0.084M, the nanoparticles were stable in seawater, with stability on par with nanoparticles in Arab-D brine (LS).

Example 2. Crosslinked Glycidylate Polyethylenimine (PEI)-Coated Polystyrenic Nanoparticles Coating Polystyrene (PS) Nanoparticles with 25 kDa Polyethylenimine.

Overview.

Figure 9:
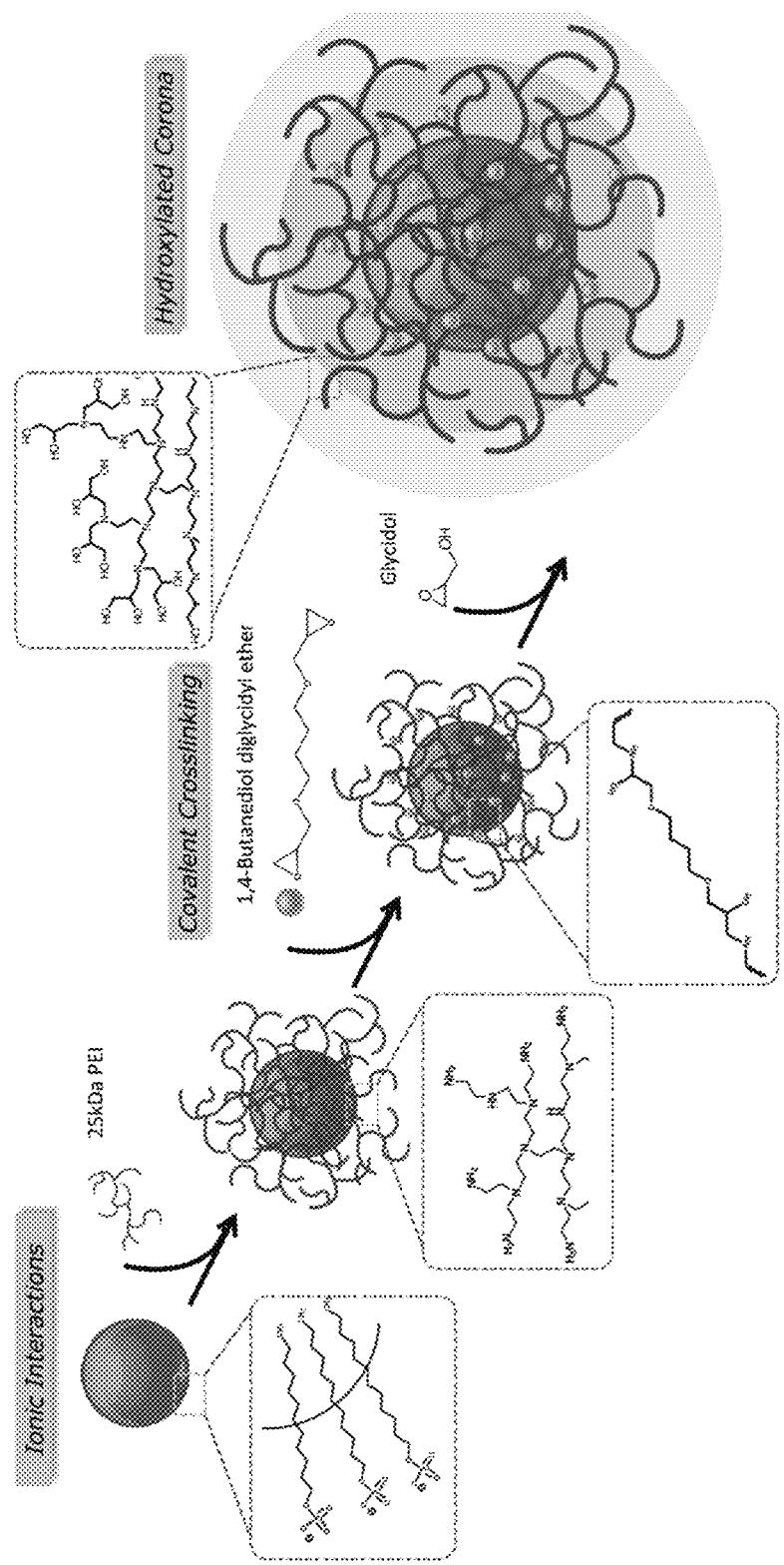
FIG. 9 shows coating, crosslinking, and glycidylation of sodium dodecyl sulfate (SDS) derivatized polystyrenic nanoparticles.

To coat the PS nanoparticles with PEI, the ionic interactions between anionic SDS and cationic PEI polymer in an aqueous solution was, in part, relied upon. As illustrated in FIG. 9, the cationic PEI polymer electrostatically adsorbs on the surface of PS nanoparticles added dropwise into the PEI solution. Next, the PEI coating was covalently crosslinked by adding the bis-epoxide crosslinker, 1,4-Butanediol diglycidyl ether. Subsequently, the nanoparticles were treated with glycidol to glycidylate the corona of the nanoparticles to obtain a highly hydroxylated surface.

Coating.

A stock solution of 25 kDa polyethylenimine (PEI) was first prepared by weighing the appropriate amount of PEI resin in a media bottle. Acetate buffer (pH 5, 0.7 mL glacial acetic acid and 0.6 g potassium hydroxide per liter) was added to the media bottle as a solvent to constitute 100 mg/mL final concentration. For example, for a typical prep of PEI stock solution, 20 g of PEI resin was weighed into a media bottle that was subsequently filled with ~200 mL of acetate buffer and homogenized.

10 mL of 1.7 wt. % 15 nm polystyrene (PS) nanoparticles with sodium dodecyl sulfate surfactant on the surface was diluted into 10 mL deionized water and placed in an addition funnel. In a round-bottom flask, 10 mL of 100 mg/mL stock PEI solution was diluted into 10 mL pH 5 acetate buffer and magnetically stirred at 500 rotations per minute (RPM). Into the PEI solution, PS nanoparticles were added dropwise using the addition funnel. Residual PS suspension in the funnel was rinsed with a small amount of deionized water and added to the PEI solution. The clear suspension obtained at the completion of the addition step was stirred overnight.

For the crosslinking step, the PEI-coated nanoparticles were first collected and the pH was adjusted to approximately 8 using 1.0M hydrochloric acid and placed in an addition funnel. 1 mL of 1,4-butanediol diglycidyl ether was added to 20 mL of deionized water in a round-bottom flask and homogenized with magnetic stirring at 500 RPM. Under this stirring rate, the PEI-coated nanoparticle solution in the addition funnel was added dropwise into the crosslinker solution. Upon completion of addition, the solution was stirred overnight. To quench the reaction, 10 mL of 2.0M tris buffer was added to the solution and left stirring for 1 hour before the cleaning step.

To remove free PEI and excess reagents from the nanoparticle solution, tangential flow filtration via 100 kDa MWCO filters was performed. For a typical prep described above, yielding approximately 75 mL nanoparticle solution, approximately 400 mL deionized water was used to clean the nanoparticles. The condition for tangential flow filtration was at approximately 2 pounds per square inch (psi) trans-membrane pressure with 25 mL/min feed rate. Two 100 kDa hollow fiber filters were attached in tandem to increase throughput of the filtration process.

The purified nanoparticles were first re-concentrated on the tangential flow filtration set-up to approximately 50 mL and further re-concentrated to approximately 20 mL using centrifugal devices with 10 kDa MWCO on the centrifuge.

Glycidylation of Crosslinked-PEI Coated PS Nanoparticles

To glycidylate 20 mL of the PEI-coated nanoparticles prepared above, 2 mL of glycidol was added into the nanoparticle solution and stirred overnight. To quench the reaction, 5 mL of 2.0M tris buffer was added to the solution and allowed to stir for at least 1 hour before the purification step.

Purification of 20 mL glycidylated nanoparticles was accomplished by washing in deionized water using 100 kDa MWCO centrifugal devices. The materials were centrifuged at 5000 g for 30 minutes. Filtrates were discarded and fresh deionized water was added to the retentate. The purification procedure was repeated three times.

The collected nanoparticles had pH of approximately 9. The pH was adjusted to a pH of approximately 6.5 using 37 wt. % hydrochloric acid before colloidal stability studies in brine were conducted.

Colloidal Stability Test Protocol

Overview.

Figure 10:
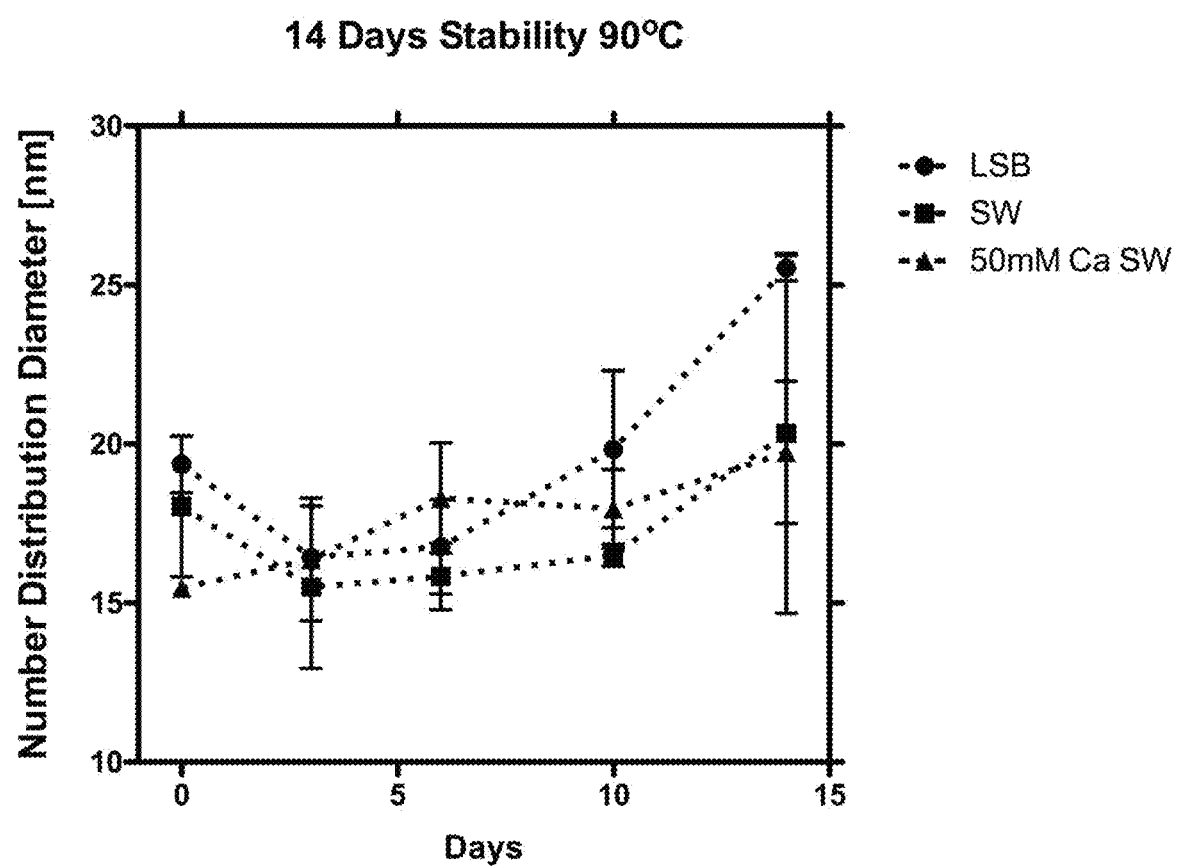
FIG. 10 shows the dynamic light scattering for glycidylated crosslinked-PEI coated nanoparticle compositions in low salinity Arab-D brine, synthetic sea water, and synthetic seawater doped with calcium over a period of 14 days at 90° C.

To ascertain the stability of the coated nanoparticles in various brines at high temperatures, 1000 ppm nanoparticle suspensions were prepared in synthetic seawater, synthetic seawater with additional calcium ions (50 mM total calcium concentration), and low salinity Arab-D brine. The nanoparticles suspensions were heat treated in an oven at 90° C. for 14 days and their hydrodynamic diameter characterized periodically by dynamic light scattering. The results are depicted in FIG. 10. Over the two-week period, the nanoparticles size remained under 25 nm in all three brine solutions.

Solution Preparation.

10 mL of 1000 ppm nanoparticle suspensions was prepared in synthetic seawater, synthetic seawater with 50 mM calcium chloride, and Arab-D brine by diluting the stock 75,000 ppm (approximately 75 mg/mL) solution into the brine solutions in glass vials. The vials were crimped with aluminum caps with rubber septa. Each solution was degassed for 5 minutes and a 3 mL aliquot of each of the samples was drawn with a syringe and loaded into separate quartz cuvettes with PTFE lined caps. The remainder of the solutions was reserved as room temperature controls.

Static Stability Test.

Before the samples were placed in the oven at 90° C., dynamic light scattering (DLS) size distribution was recorded. Over 14 days, samples were removed periodically from the oven for DLS size distribution measurements after they cooled to ambient temperature. After each measurement, the samples were returned to the oven.

Dynamic Light Scattering (DLS).

All samples were measured at 1000 ppm without filtration or dilution. For each sample, three measurements at three minutes acquisition time were taken. No adjustments in solution viscosity in the measurement parameters were made for the samples in brine.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A coated nanoparticle composition comprising:
a coated nanoparticle comprising:
a nanoparticle;
a linker comprising a silane anchoring group, a spacer, and a terminal group; and
a stabilizing group, comprising a functional group selected from the group consisting of:

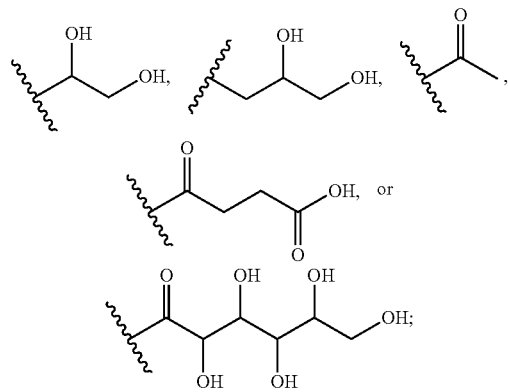

wherein the silane anchoring group is covalently bound to the nanoparticle core and at least one of the terminal groups is covalently bound to the stabilizing group; and
an ion.

2. The coated nanoparticle composition of claim 1, wherein the nanoparticle is a silica nanoparticle.

3. The coated nanoparticle composition of claim 1, wherein the linker comprises polyethylenimine.

4. A coated nanoparticle composition of claim 1, wherein the ion comprises one or more of a lithium ion, a sodium ion, a potassium ion, a silver ion, a magnesium ion, a calcium ion, a barium ion, a zinc ion, an aluminum ion, a bismuth ion, a copper (I) ion, a copper (II) ion, an iron (II) ion, an iron (III) ion, a tin (II) ion, a tin (IV) ion, a chromium (II) ion, a chromium (III) ion, a manganese (II) ion, a manganese (III) ion, a mercury (I) ion, a mercury (II) ion, a lead (II) ion, a lead (IV) ion, a cobalt (II) ion, a cobalt (III) ion, a nickel ion (II), a nickel (IV) ion, a titanium ion, and a titanium (IV) ion.

5. The coated nanoparticle composition of claim 1, wherein the ion comprises a calcium ion.

* * * * *